(12) United States Patent
Mason et al.

(10) Patent No.: US 10,589,699 B2
(45) Date of Patent: Mar. 17, 2020

(54) POWER AND COMMUNICATION MODES FOR DIGITAL LICENSE PLATE

(71) Applicant: ReviverMx, Inc., Foster City, CA (US)

(72) Inventors: Todd Christopher Mason, Danville, CA (US); John Chen, San Ramon, CA (US); Avi Kopelman, Sunnyvale, CA (US); John Spall, San Ramon, CA (US); Dean Batten, North Bend, WA (US)

(73) Assignee: REVIVERMX, INC., Foster City, CA (US)

( * ) Notice: Subject to any disclaimer, the term of this patent is extended or adjusted under 35 U.S.C. 154(b) by 0 days.

(21) Appl. No.: 15/863,530

(22) Filed: Jan. 5, 2018

(65) Prior Publication Data

US 2018/0186311 A1 Jul. 5, 2018

Related U.S. Application Data

(60) Provisional application No. 62/442,755, filed on Jan. 5, 2017, provisional application No. 62/547,611, filed on Aug. 18, 2017.

(51) Int. Cl.
| | |
|---|---|
| *G08B 5/36* | (2006.01) |
| *B60R 13/10* | (2006.01) |
| *B60Q 1/56* | (2006.01) |
| *G01P 13/00* | (2006.01) |
| *G06F 1/3206* | (2019.01) |
| *H04W 4/44* | (2018.01) |
| *B60R 21/01* | (2006.01) |
| *G06F 1/3234* | (2019.01) |
| *H04W 4/02* | (2018.01) |
| *H04W 4/80* | (2018.01) |

(52) U.S. Cl.
CPC .............. *B60R 13/105* (2013.01); *B60Q 1/56* (2013.01); *B60R 21/01* (2013.01); *G01P 13/00* (2013.01); *G06F 1/3206* (2013.01); *G06F 1/3265* (2013.01); *H04W 4/44* (2018.02); *H04W 4/02* (2013.01); *H04W 4/80* (2018.02)

(58) Field of Classification Search
CPC .................................. A61B 1/00; G08B 1/00
See application file for complete search history.

(56) References Cited

U.S. PATENT DOCUMENTS

| | | |
|---|---|---|
| 4,001,822 A | 1/1977 | Sterzer |
| 4,928,084 A | 5/1990 | Reiser |
| 5,105,179 A | 4/1992 | Smith |

(Continued)

FOREIGN PATENT DOCUMENTS

| | | |
|---|---|---|
| CA | 2102342 C | 1/1999 |
| CN | 1958342 A | 5/2007 |

(Continued)

*Primary Examiner* — Shirley Lu
(74) *Attorney, Agent, or Firm* — David R. Stevens; Stevens Law Group

(57) ABSTRACT

A digital license plate system having various power and communication modes to improve performance and increase expected battery life is disclosed. In one embodiment, a response to a sensor triggered plate event requires determination of whether a vehicle is running, parked or in-motion. This determination involves waking the processor, establishing wireless connectivity, and determining if the vehicle is in motion based on local sensor data.

6 Claims, 26 Drawing Sheets

(56) References Cited

U.S. PATENT DOCUMENTS

| | | |
|---|---|---|
| 5,132,666 A | 7/1992 | Fahs |
| 5,155,689 A | 10/1992 | Wortham |
| 5,299,132 A | 3/1994 | Wortham |
| 5,381,155 A | 1/1995 | Gerber |
| 5,396,233 A | 3/1995 | Hofmann |
| 5,398,190 A | 3/1995 | Wortham |
| 5,404,664 A | 4/1995 | Brooks |
| 5,422,624 A | 6/1995 | Smith |
| 5,513,111 A | 4/1996 | Wortham |
| 5,519,621 A | 5/1996 | Wortham |
| 5,533,045 A | 7/1996 | Hasegawa |
| 5,552,789 A | 9/1996 | Schuermann |
| 5,579,008 A | 11/1996 | Hulderman |
| 5,608,391 A | 3/1997 | Bantli |
| 5,621,571 A | 4/1997 | Bantli |
| 5,627,549 A | 5/1997 | Park |
| 5,652,707 A | 7/1997 | Wortham |
| 5,657,008 A | 8/1997 | Bantli |
| 5,699,275 A | 12/1997 | Beasley |
| 5,717,374 A | 2/1998 | Smith |
| 5,747,938 A | 5/1998 | Beard |
| 5,832,394 A | 11/1998 | Wortham |
| 5,873,068 A | 2/1999 | Beaumont |
| 5,884,221 A | 3/1999 | Wortham |
| 5,937,392 A | 8/1999 | Alberts |
| 5,963,129 A | 10/1999 | Warner |
| 6,025,784 A | 2/2000 | Mish |
| 6,026,060 A | 2/2000 | Rothschild |
| 6,052,068 A | 4/2000 | Price |
| 6,067,008 A | 5/2000 | Smith |
| 6,085,805 A | 7/2000 | Bates |
| 6,108,954 A | 8/2000 | Eiteneer |
| 6,124,805 A | 9/2000 | Gabbard |
| 6,148,202 A | 11/2000 | Wortham |
| 6,229,434 B1 | 5/2001 | Knapp |
| 6,236,357 B1 | 5/2001 | Corwith |
| 6,239,757 B1 | 5/2001 | Ishikawa |
| 6,253,143 B1 | 6/2001 | Silvernagle |
| 6,298,306 B1 | 10/2001 | Suarez |
| 6,359,570 B1 | 3/2002 | Adcox |
| 6,404,327 B1 | 6/2002 | Naddeo |
| 6,411,217 B1 | 6/2002 | Gabbard |
| 6,489,897 B2 | 12/2002 | Simon |
| 6,523,976 B1 | 2/2003 | Turnbull et al. |
| 6,545,596 B1 | 4/2003 | Moon |
| 6,553,131 B1 | 4/2003 | Neubauer |
| 6,556,905 B1 | 4/2003 | Mittelsteadt |
| 6,608,556 B2 | 8/2003 | De Moerloose |
| 6,641,038 B2 | 11/2003 | Gehlot |
| 6,678,612 B1 | 1/2004 | Khawam |
| 6,701,143 B1 | 3/2004 | Dukach |
| 6,717,527 B2 | 4/2004 | Simon |
| 6,728,605 B2 | 4/2004 | Lash |
| 6,731,238 B2 | 5/2004 | Johnson |
| 6,741,920 B1 | 5/2004 | Otto |
| 6,748,682 B1 | 6/2004 | Sims |
| 6,812,851 B1 | 11/2004 | Dukach |
| 6,842,121 B1 | 1/2005 | Tuttle |
| 6,850,209 B2 | 2/2005 | Mankins |
| 6,853,907 B2 | 2/2005 | Peterson |
| 6,864,784 B1 | 3/2005 | Loeb |
| 6,866,191 B2 | 3/2005 | Messina |
| 6,873,297 B1 | 3/2005 | Posluszny |
| 6,909,964 B2 | 6/2005 | Armstrong |
| 6,914,540 B2 | 7/2005 | Gongolas |
| 6,922,137 B1 | 7/2005 | Bycroft |
| 6,922,138 B2 | 7/2005 | Melvin |
| 6,968,176 B2 | 11/2005 | Juzswik |
| 7,015,792 B2 | 3/2006 | Lessard |
| 7,026,918 B2 | 4/2006 | Briick |
| 7,027,772 B2 | 4/2006 | Chen |
| 7,076,244 B2 | 7/2006 | Lazaridis |
| 7,096,102 B1 | 8/2006 | Parker, Sr. |
| 7,117,075 B1 | 10/2006 | Larschan |
| 7,142,104 B1 | 11/2006 | Blueford |
| 7,145,507 B2 | 12/2006 | Luo |
| 7,154,383 B2 | 12/2006 | Berquist |
| 7,161,563 B2 | 1/2007 | Vitale |
| 7,319,379 B1 | 1/2008 | Melvin |
| 7,383,983 B2 | 6/2008 | Gaumond |
| 7,389,198 B1 | 6/2008 | Dimitriadis |
| 7,394,403 B2 | 7/2008 | Winkler |
| 7,426,480 B2 | 9/2008 | Granger |
| 7,430,471 B2 | 9/2008 | Simon |
| 7,430,822 B1 | 10/2008 | Combs |
| 7,444,227 B2 | 10/2008 | Tengler |
| 7,449,998 B1 | 11/2008 | Au |
| 7,463,150 B2 | 12/2008 | Rajan |
| 7,466,241 B2 | 12/2008 | Lyle |
| 7,478,492 B2 | 1/2009 | Madonia |
| 7,482,910 B2 | 1/2009 | Melvin |
| 7,498,929 B2 | 3/2009 | Pedrick |
| 7,502,827 B2 | 3/2009 | Arfaa |
| 7,504,965 B1 | 3/2009 | Windover |
| 7,525,433 B2 | 4/2009 | Tanaka |
| 7,535,342 B2 | 5/2009 | Tanaka |
| 7,536,189 B2 | 5/2009 | Himmelstein |
| 7,551,088 B2 | 6/2009 | Findlay |
| 7,554,464 B1 | 6/2009 | Oberdorfer |
| 7,565,141 B2 | 7/2009 | Macaluso |
| 7,595,740 B2 | 9/2009 | Pechenick |
| RE41,085 E | 1/2010 | Anthonyson |
| 7,657,373 B2 | 2/2010 | Kindo |
| 7,696,864 B2 | 4/2010 | Dillon |
| 7,714,703 B2 | 5/2010 | Tanaka |
| 7,825,790 B2 | 11/2010 | Tallinger |
| 7,909,974 B2 | 3/2011 | Bartels |
| 7,920,047 B2 | 4/2011 | Bates |
| 7,923,962 B2 | 4/2011 | Jovanovich |
| 8,035,503 B2 | 10/2011 | Partin |
| 8,068,266 B2 | 11/2011 | Kim |
| 8,180,279 B2 | 5/2012 | Crowley |
| 8,188,850 B2 | 5/2012 | Smith |
| 8,223,010 B2 | 7/2012 | Petite |
| 8,232,865 B2 | 7/2012 | Bates |
| 8,250,366 B2 | 8/2012 | Longobardi |
| 8,250,793 B1 | 8/2012 | Halula |
| 8,264,778 B2 | 9/2012 | Kim |
| 8,332,095 B2 | 12/2012 | Hembury |
| 8,334,961 B2 | 12/2012 | Montbach |
| 8,344,890 B2 | 1/2013 | Zhu |
| 8,353,372 B2 | 1/2013 | Dorais |
| 8,373,917 B2 | 2/2013 | Chen |
| 8,427,753 B2 | 4/2013 | Bartels |
| 8,456,728 B2 | 6/2013 | Chen |
| 8,525,817 B2 | 9/2013 | Sah |
| 8,529,686 B2 | 9/2013 | Chao |
| 8,593,713 B2 | 11/2013 | Wu |
| 8,631,921 B2 | 1/2014 | Jones |
| 8,633,800 B2 | 1/2014 | Bates |
| 8,656,165 B2 | 2/2014 | Longobardi |
| 8,662,279 B2 | 3/2014 | Jones |
| 8,675,273 B2 | 3/2014 | Yang |
| 8,684,158 B2 | 4/2014 | Jones |
| 8,760,746 B2 | 6/2014 | Tian |
| 8,830,558 B2 | 9/2014 | Kuo |
| 8,842,360 B2 | 9/2014 | Shim |
| 8,868,099 B2 | 10/2014 | Espinosa De |
| 8,922,871 B2 | 12/2014 | Choi |
| 8,938,614 B2 | 1/2015 | Fischer |
| 9,007,193 B2 | 4/2015 | Boston |
| 9,013,779 B2 | 4/2015 | Lee |
| 9,123,184 B2 | 9/2015 | Jones |
| 9,158,105 B2 | 10/2015 | Chen |
| 9,182,588 B2 | 11/2015 | Shin |
| 9,182,590 B2 | 11/2015 | Nomura |
| 9,201,235 B2 | 12/2015 | Jung |
| 9,221,405 B2 | 12/2015 | Davis |
| 9,275,503 B2 | 3/2016 | Chen |
| 9,317,724 B2 | 4/2016 | Matsur |
| 9,483,777 B2 | 11/2016 | Sarangi |
| 9,615,430 B2 | 4/2017 | Meritt |
| 9,663,028 B2 | 5/2017 | Parkes |
| 9,663,043 B2 | 5/2017 | Belegu |

(56) References Cited

U.S. PATENT DOCUMENTS

| | | |
|---|---|---|
| 9,902,343 B2 | 2/2018 | Hague |
| 9,940,089 B2 | 4/2018 | Bender |
| 10,053,028 B2 | 8/2018 | Haque |
| 10,112,528 B1 | 10/2018 | Mazuir |
| 10,181,104 B2 | 1/2019 | Haque |
| 2001/0001319 A1 | 5/2001 | Beckert |
| 2002/0021210 A1 | 2/2002 | Naddeo |
| 2002/0044069 A1 | 4/2002 | Jenkinson |
| 2002/0097193 A1 | 7/2002 | Powers |
| 2003/0034934 A1 | 2/2003 | Brewer |
| 2003/0050744 A1 | 3/2003 | Saraiva |
| 2003/0112242 A1 | 6/2003 | Vitale |
| 2003/0140536 A1 | 7/2003 | Bilyeu |
| 2003/0142044 A1 | 7/2003 | Berry |
| 2003/0200227 A1 | 10/2003 | Ressler |
| 2004/0004539 A1 | 1/2004 | Collins |
| 2004/0021579 A1 | 2/2004 | Oursler |
| 2004/0050936 A1 | 3/2004 | Look |
| 2004/0128891 A1 | 7/2004 | Keach |
| 2004/0189493 A1 | 9/2004 | Estus |
| 2004/0207526 A1 | 10/2004 | Liao |
| 2004/0210757 A1 | 10/2004 | Kogan |
| 2004/0226204 A1 | 11/2004 | Green |
| 2004/0230480 A1 | 11/2004 | Kanayama |
| 2004/0263357 A1 | 12/2004 | Hamilton |
| 2005/0192744 A1 | 9/2005 | Maqui |
| 2005/0198876 A1 | 9/2005 | Chang |
| 2005/0274050 A1 | 12/2005 | Liu |
| 2006/0142933 A1 | 6/2006 | Feng |
| 2006/0164258 A1 | 7/2006 | Garibotto |
| 2006/0213100 A1 | 9/2006 | Mccann |
| 2006/0227010 A1 | 10/2006 | Berstis |
| 2007/0008084 A1 | 1/2007 | Wu |
| 2007/0038353 A1 | 2/2007 | Larschan |
| 2007/0046499 A1 | 3/2007 | McKenna |
| 2007/0050108 A1* | 3/2007 | Larschan ............... G07C 5/085 701/33.4 |
| 2007/0132664 A1 | 6/2007 | Weissman |
| 2007/0136900 A1 | 6/2007 | Watters |
| 2007/0285361 A1 | 12/2007 | Jovanovich |
| 2008/0042848 A1 | 2/2008 | Roberts |
| 2008/0059299 A1 | 3/2008 | Hamoui |
| 2008/0120875 A1 | 5/2008 | Yen |
| 2008/0129540 A1 | 6/2008 | Williams |
| 2008/0150854 A1 | 6/2008 | Bryant |
| 2008/0178502 A1 | 7/2008 | Stuchell |
| 2008/0252457 A1 | 10/2008 | Findlay |
| 2008/0258938 A1 | 10/2008 | Moon |
| 2009/0288320 A1 | 11/2009 | El Emam |
| 2009/0299857 A1 | 12/2009 | Brubaker |
| 2010/0259058 A1 | 10/2010 | Knighton |
| 2010/0286906 A1 | 11/2010 | Nogawa |
| 2011/0015971 A1 | 1/2011 | Hembury |
| 2011/0037619 A1 | 2/2011 | Ginsberg |
| 2011/0078933 A1 | 4/2011 | Lukawitz |
| 2011/0140996 A1 | 6/2011 | Parry-Jones |
| 2011/0252675 A1 | 10/2011 | Thomas |
| 2011/0291822 A1 | 12/2011 | Boston |
| 2011/0295697 A1 | 12/2011 | Boston |
| 2012/0181340 A1 | 7/2012 | Hsu |
| 2012/0303458 A1 | 11/2012 | Schuler, Jr. |
| 2013/0006775 A1 | 1/2013 | Jordan |
| 2013/0250396 A1 | 9/2013 | Kim |
| 2013/0258443 A1 | 10/2013 | Jung |
| 2013/0293349 A1 | 11/2013 | Templ |
| 2013/0325629 A1 | 12/2013 | Harrison |
| 2014/0019230 A1 | 1/2014 | Lawson |
| 2014/0049807 A1 | 2/2014 | Kato |
| 2014/0055276 A1 | 2/2014 | Logan |
| 2014/0090280 A1 | 4/2014 | Cunningham |
| 2014/0249713 A1 | 9/2014 | Davis |
| 2015/0039365 A1 | 2/2015 | Haque |
| 2015/0130641 A1 | 5/2015 | Rahman |
| 2015/0353031 A1 | 12/2015 | Cairo |
| 2015/0365479 A1 | 12/2015 | Cunningham |
| 2015/0379578 A1 | 12/2015 | Mendoza |
| 2016/0039364 A1 | 2/2016 | Findlay |
| 2016/0297324 A1* | 10/2016 | Taylor .................. B60N 2/002 |
| 2017/0066408 A1 | 3/2017 | Nyalamadugu |
| 2017/0297497 A1* | 10/2017 | De Wind .................. B60R 1/12 |

FOREIGN PATENT DOCUMENTS

| | | | |
|---|---|---|---|
| CN | 201029037 Y | 2/2008 | |
| CN | 100397415 C | 6/2008 | |
| CN | 101325002 B | 9/2010 | |
| CN | 102152764 B | 8/2012 | |
| CN | 102289693 * | 9/2013 | ............... G08B 1/00 |
| EP | 0648653 A1 | 4/1995 | |
| GB | 2275808 A | 9/1994 | |
| GB | 2436884 A | 10/2007 | |
| JP | 3956865 B2 | 8/2007 | |
| WO | WO/1996/036031 A1 | 11/1996 | |

* cited by examiner

601

| State | CPU | Modem | Screen Info | Front Light | GPS | OBD-II |
|---|---|---|---|---|---|---|
| 602 | On | Connected | Changeable | On | On | On |
| 604 | Off | Off | Frozen on last image | Off | Off | Off |
| 606 | On, but low power | Connected | Changeable | On | Off | Off |
| 608 | Suspended /low power | Low power/listening for SMS | Frozen on last image | Off | Off | Off |

| State | CPU | Modem | Screen | Back Light | GPS | OBD-II |
|---|---|---|---|---|---|---|
| 702 | On | Connected | On | On | On | On |
| 704 | Off | Off | Off | Off | Off | Off |
| 706 | On, but low power | Connected | On | On | Off | Off |
| 708 | Suspended /low power | Low power/listening for SMS | Off | Off | Off | Off |
| 724 | Suspended /low power | Low power/listening for SMS | On | On | Off | Off |

Fig. 7B

POWER AND COMMUNICATION MODES FOR DIGITAL LICENSE PLATE

RELATED APPLICATIONS

This application claims the benefit of U.S. Provisional Application Ser. No. 62/442,755, filed Jan. 5, 2017 and U.S. Provisional Application Ser. No. 62/547,611, filed Aug. 18, 2017. The applications are incorporated herein by reference for all purposes.

TECHNICAL FIELD

The present disclosure generally relates to a digital license plate. More particularly, a system having various power and communication modes to improve performance and increase expected battery life is disclosed.

BACKGROUND AND SUMMARY

Upon registering a vehicle, the owner of a vehicle is typically issued a license plate that displays the vehicle identification and registration information. Such license plates printed or stamped. Electrical power is not needed to view license plates in daytime, and low power lightbulbs or LEDs are all that is needed to provide light for nighttime viewing of the license plate.

One potential apparatus for creating, storing, and processing vehicle data is available in conjunction with dynamic display that presents vehicle identification and registration information and can be arranged on the exterior of a vehicle. For example, U.S. Pat. No. 9,007,193, and pending published US Patent application US20130006775, both assigned to ReviverMX, describe a dynamic display that improves updateability of vehicle identification and registration information by use of a digital license plate.

However, digital license plates do require a significant amount of electrical power to operate and display required licensing information. A power supply system able to support operation when the vehicle is turned on or off, in conjunction with a range of local and remote communication systems, as well as in a wide range of thermal and environmental conditions, is necessary. These can be provided by use of sensor connected processor, and a digital license plate that supports various states, as discussed herein.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 6B presents a table showing how power states affect system components;

FIG. 7B presents a table showing how power states affect system components;

DETAILED DESCRIPTION

Figure 1:
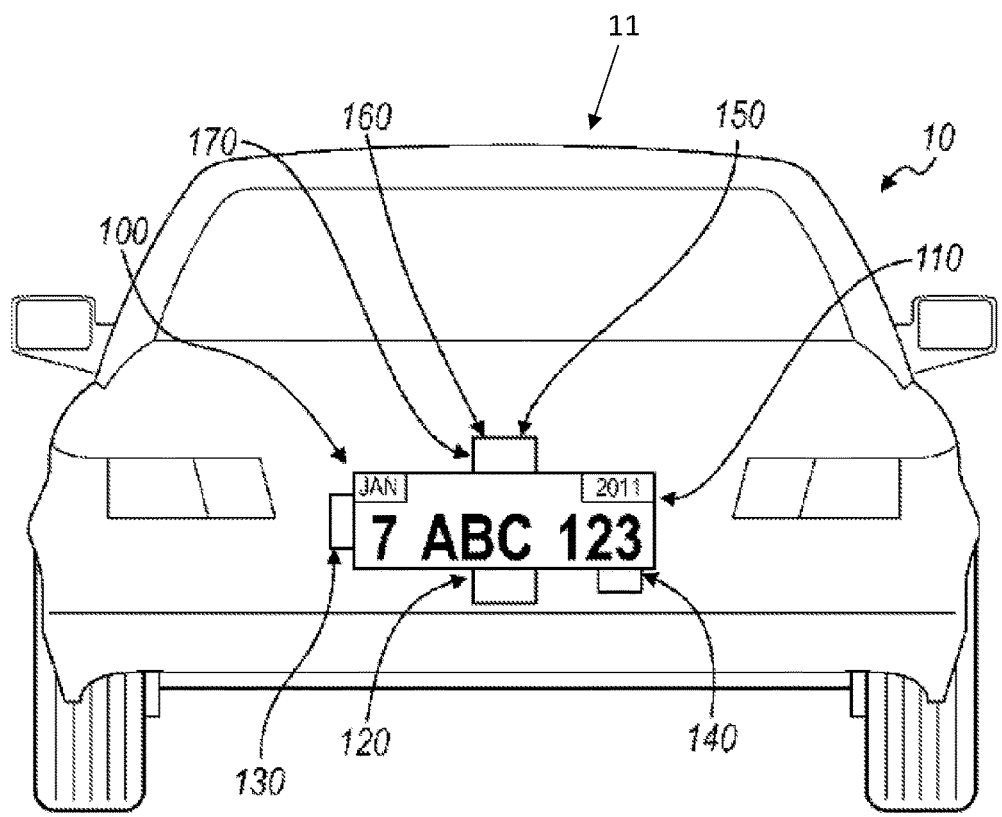
FIG. 1 illustrates one embodiment of a digital license plate system.

FIG. 1 illustrates one embodiment of a digital license plate system 11 supporting a dynamic display that presents vehicle identification and registration information and can be arranged on an exterior of a vehicle 10. The system 10 includes a display system 100 for use on the exterior of a vehicle 10 includes a display 110, a vehicle speed sensor 120, and a processor 130 coupled to the vehicle speed sensor 120. The processor 130 is configured to implement one of three operational modes of the display system 100 based on the speed and state of the vehicle 10: a first operational mode, wherein a first content, including identification information of the vehicle 10 and/or registration information of the vehicle 10 is rendered on the display 110 at a first power consumption level; a second operational mode, wherein a second content, including a message, identification information of the vehicle 10, and/or registration information of the vehicle 10, is rendered on the display 110; and a third operational mode, wherein content is rendered on the display 110 at a second power consumption level less than the first power consumption level. The display system 100 preferably also includes a communication device 140 that allows content (for example, updated identification information, registration information, and/or messages) to be transferred to and from the display system 100. The display system 100 may also include a location sensor 160, for example, a Global Positioning System (GPS) device, a cellular tower location triangulation device, or any other suitable location sensor that determines the location of the vehicle 10 on which the display 110 is arranged. The location sensor 160 may provide a substantially general location or a substantially exact location of the vehicle. Additionally, the display system 100 may include a storage device 150 that functions to store content; the processor 130 may retrieve content from the storage device 150 and render it on the display 110. The display system 100 may further comprise a sensor that determines the proximity of the vehicle 10 to a second vehicle.

The digital license plate system 11 is preferably used for registered vehicles such as personal cars, trucks, motorcycles, rental cars, corporately-owned cars, or any other suitable type of vehicle. The display system 100 functions to render identification and/or registration information of the vehicle 10 that is preferably provided by an official authority, such as a Department of Motor Vehicles (DMV). Preferably, the processor 120 renders the identification and/or registration information of the vehicle 10 on the display 110 such that a state vehicle code is followed, such as the size and dimension of the displayed area, the content, size, and lettering style of the information, and the visibility and reflectivity of the display 110. Preferably, the processor 120 renders content on the display 110 such that the state vehicle code of the state in which the vehicle 10 is registered is followed; alternatively, such as in the embodiment of the invention that incorporates a location sensor (such as a GPS device), the processor 120 may render content on the display 110 such that the state vehicle code of the state in which the vehicle is located is followed. The display system 100 preferably functions to display a message in addition to the vehicle identification and/or registration information. The message is preferably provided by an advertiser, for example, an advertiser that is substantially unrelated to the user. The subject matter of the advertisement provided by the advertiser may be substantially unrelated to the driver and/or owner of the vehicle 10, and the advertisement may be substantially unrelated to the vehicle 10. Alternatively, the advertisement may be related to a demographic to which the driver and/or owner of the vehicle 10 belongs or to any other suitable characteristic of the driver and/or owner of the vehicle 10. The advertisement may also be selectable by the driver and/or owner of the vehicle 10, for example, via the Internet on a personal computer, via the internet on an internet-capable mobile phone, or via any other suitable method. The advertisement may also be substantially related to the vehicle 10, for example, a display system mounted to a Porsche may display advertisements that are targeted at a demographic with a brand affinity toward Porsches. The advertisements may be substantially related to the location of the vehicle 10, for example, if the vehicle 10 is traveling within the vicinity of a venue, an advertisement for the venue may be shown. Alternatively, the message may be provided by a law enforcement agency, for example, an emergency broadcast regarding a missing person (for example, an Amber or an Elder alert). Furthermore, if the vehicle 10 is reported stolen, the message may indicate that the vehicle 10 is stolen, thus allowing parties external to the vehicle to identify the vehicle 10 as such.

Alternatively, the message may be any suitable type of message and may be controlled by any suitable party, for example, an official organization (for example, the DMV), the driver of the vehicle 10, the owner of the vehicle 10, a third party unrelated to the vehicle 10, or any other suitable party. In a first example, the message may include additional details related to the vehicle 10, including the model of the vehicle 10, the smog check results of the vehicle 10, maintenance issues of vehicle 10, or any other suitable type of information related to the vehicle 10. In a second example, the message may include details related to the driver of the vehicle 10, including organizations that the driver supports or belongs to (for example, the Girl Scouts, the San Francisco Giants baseball team, or a political party), a cause that the driver supports (for example, People for the Ethical Treatment of Animals (PETA) or cancer awareness), the demographic of the driver, or any other suitable type of information related to the driver. In this second example, the message may also include official details regarding the driver; for example, the message may indicate that the driver is a doctor or a law enforcement officer, allowing people outside the vehicle 10 to direct requests to the driver when his services are desired. Official details may also include details relating to the driving history of the driver; for example, if the driver has an imperfect driving record, a notification may be rendered on the display in order to warn others in the vicinity of the vehicle. In a third example, the message may include notifications for drivers in the vicinity of the vehicle 10, for example, traffic information or weather forecasts. In a fourth example, the message may include details regarding the owner of the vehicle. This may be particularly useful when the vehicle 10 is a member of a fleet of cars, for example, a car rental agency, a moving truck rental agency, a government fleet, or any other suitable type of fleet. The message of the fourth example may indicate which fleet the vehicle 10 belongs to; this information may be used to identify vehicles, to advertise regarding the fleet (for example, if the vehicle 10 belongs to a rental car agency, the message may include an advertisement or a message for that particular rental car agency), or for any other suitable purpose. However, the message may be of any other suitable type of message.

The display system 100 is preferably powered by a power source. The power source is preferably a power source of the vehicle 10, such as the accessories battery of the vehicle 10, the engine of the vehicle 10, or any other suitable power source of the vehicle 10. Alternatively, the display system 100 may include and be powered by a power source that is substantially independent from a power source of the vehicle 10. The power source of the display system 100 is preferably a battery, but may alternatively be a solar panel, wind generator, or any other suitable type of power source or combination of power sources. Yet alternatively, the display system 100 may include a power source that is rechargeable and coupled to a power source of the vehicle 10 that stores power from the vehicle 10 while the vehicle 10 is in operation and/or the ignition of the vehicle 10 is on. In this variation, the power source of the display system 100 allows for power generated while the vehicle is in operation to be used at a later time by the display system 100. However, the display system 100 may be powered using any other suitable method and/or arrangement.

The display 110 functions to display content, wherein content includes at least one of the identification information of the vehicle 10, registration information of the vehicle 10, and a message. The display 110 is operated by the processor 130 in one of the three operational modes. The display 110 is preferably of a substantially low power display, such as an LED display, an LCD display, an e-ink display, an organic LED display, an interferometric modulator display (iMoD), a display that uses electrophoretic deposition (EPD), a cholesteric liquid crystal display (ChLCDs), or any other suitable display. The display 110 may alternatively be a combination of the above display types. The display 110 preferably also has a substantially wide range of viewing angles. The display 110 is preferably also substantially thin, allowing the display 110 to replace existing license plates on the rear and/or front exterior of the vehicle. Similarly, the display 110 is preferably of a width, height, and/or aspect ratio that is/are substantially similar to existing license plates. Alternatively, the display 110 may be substantially different than existing license plates (for example, in the case of the relatively narrow height of European license plates, the display 110 may be of a substantially different height). However the display 110 may be of any other suitable dimension.

The display 110 may also include a backlight. The backlight functions to control the light intensity of the information displayed by the display 110. The backlight preferably includes a plurality of degrees of light intensity. The processor 130 may select the degree of light intensity based upon the mode of operation. The processor 130 may also select the degree of light intensity based upon ambient light levels proximal to the display 110. For example, the degree of light intensity may be higher during the day and lower during the night. In this variation, the display system 100 also includes a light sensor to detect the level of ambient light. The degree of light intensity of the display system 100 may also be selected based on the preferences of the driver, a law enforcement officer, or any other suitable party. However, the degree of light intensity of the display system 100 may be selected based on any other suitable criteria. The backlight may be a set of lights located substantially on the perimeter of the display 110 and that are directed toward the display 110. Alternatively, the backlight may be located substantially behind the display 110 and provide light from behind the display 110. However, the backlight may be of any other suitable arrangement. The backlight may be a series of low-power light sources, such as LEDs, but may alternatively be any other type of light source. Alternatively, the display may include a light-reflective surface that functions to illuminate the display 110 with reflected light. The light-reflective surface may be a mirror or any other suitable type of reflective material. The light-reflective surface may also be of a retroreflective material that reflects light back in the direction of the light source. The light-reflective surface may also be combined with a light source to more effectively illuminate the display 110, for example, the transflective materials used on freeway signs. However, any other suitable material or method may be used to illuminate the display.

The vehicle speed sensor 120 functions to detect the speed of the vehicle 10. The vehicle speed sensor 120 is preferably a sensor that measures the actual velocity and/or acceleration of the vehicle 10, such as an accelerometer coupled to the vehicle 10 or a tachometer coupled to the drivetrain of the vehicle 10 and which measures the number of revolutions of a drivetrain component, such as a wheel, for a period of time in order to determine the speed of the vehicle 10. In a second variation, the vehicle speed sensor 120 couples to the speedometer of the vehicle 10 and/or an onboard computer of the vehicle 10; in this configuration, the speed sensor 120 functions to transmit information gathered by the speedometer and/or the onboard computer to the processor 130, rather than measure the vehicle speed directly. However, the vehicle speed sensor 120 may be any other suitable type of sensor that determines the actual speed and/or acceleration of the vehicle 10. Alternatively, the vehicle speed sensor 120 may be a sensor that measures the relative velocity and/or acceleration of the vehicle, for example an ultrasonic sensor or an infrared sensor that determines the speed of the vehicle relative to another object. The other object may be a stationary portion of the road or a nearby vehicle. However, the vehicle speed sensor 120 may determine the speed of the vehicle 10 using any other suitable method or sensor type.

The processor 130 functions to render content on the display 110 based upon the operational mode of the display system 100: a first mode, wherein a first content is rendered on the display 110 at a first power consumption level, the first content including identification information of the vehicle 10 and/or registration information of the vehicle 10; a second mode, wherein a second content is rendered on the display 110, the second content including a message and possibly including identification information of the vehicle 10 and/or registration information of the vehicle 10; and a third mode, wherein content is rendered on the display 110 at a second power consumption level that is less than the first power consumption level. Preferably, content rendered in the third operational mode includes the identification and registration information of the vehicle 10. In a variation of the display system 100, content rendered in the third operational mode includes a message in addition to the identification and/or registration information of the vehicle 10. However, content rendered on the display 110 in the third operational mode may include any other information or messages or any combination thereof.

The processor 130 is preferably coupled to the vehicle speed sensor 120. As mentioned above, the speed determined by the vehicle speed sensor 120 may be the actual speed of the vehicle 10 or may alternatively be the speed of the vehicle 10 relative to another object (for example, a neighboring vehicle). The processor 130 preferably selects the operational mode of the display system 100 based on the speed and power state of the vehicle 10. However, a device other than the processor, such as the onboard computer of the vehicle 10, a law enforcement officer, a second processor connected to a remote server, or any other suitable device or institution may select the operational mode of the display system 100. The processor 130 preferably operates the display 110 in the first and second operational modes when the vehicle 10 is on, and the processor preferably operates the display 110 in the third operational mode when the vehicle 10 is off. The vehicle 10 is preferably considered "on" when the driver turns any portion of the vehicle 10 on. In many cars, there is a plurality of "on" states, for example, a first "on" state in which basic functionality, such as opening and closing windows, is allowed; a second "on" state in which more advanced and/or higher-power functionality, such as ventilation systems or the sound system, is allowed; and a third "on" state in which the vehicle may be driven (or, in other words, the ignition is on). The vehicle 10 may be considered "off" otherwise. In the "off" state, certain portions of the vehicle may still be "on", for example, security sensors, key proximity sensors (such as keyless entry), or any other type of substantially-low-power functionality. Alternatively, the vehicle 10 may be considered "on" when the ignition is on and considered "off" when the ignition is off, regardless of any other functionality that the vehicle may provide to the driver. Yet alternatively, the vehicle 10 may be considered "on" when the presence of a person is detected within the vehicle and "off" when there is no one within the vehicle. The vehicle 10 may also be considered off when the emergency brake or transmission parking brake of the vehicle 10 is engaged, regardless of the state of the ignition or presence of a person within the vehicle 10. However, the vehicle may be considered "on" and "off" using any other suitable criteria. The processor 130 preferably operates the display 110 in the first operational mode when the vehicle 10 is at a first speed and preferably operates the display 110 in the second operational mode when the vehicle 10 is at a second speed lower than the first speed. The second speed is preferably substantially zero speed, or substantially close to zero speed. This allows for identification and/or registration information of the vehicle 10 to be substantially visible while the vehicle 10 is in motion (the first speed), as shown in FIG. 1. This allows any party external to the vehicle 10 to visually access the information rendered on the display 110 in a manner similar to that used to visually access information on a static (or stamped) license plate. In one variation, the processor 130 operates the display 110 in the second operational mode and renders the second content on the display 110 when the vehicle 10 is on and at the second speed, wherein the second speed is preferably zero speed or a substantially slow speed, such as when the vehicle is moving slowly through heavy traffic. Because the message depicted in the second mode takes up a portion of the display area of the display, the identification and/or registration information also depicted may consume a smaller portion of the display area in the second operational mode as compared to the first operational mode. Because the identification and registration information is depicted in a is smaller size on the display 110 when a message is displayed concurrently with the vehicle 10 information, the visibility of the identification and registration information may be less in the second operational mode than in the first operational mode. Alternatively, the identification and/or registration information rendered on the display 110 in the second operational mode may be of the same or similar format (for example, size and layout) as in the first mode, but the message may be rendered on the display to overlap the identification and/or registration information. This may also result in reduced visibility of the identification and/or registration information of the vehicle 10. Therefore, the message may be displayed only under such conditions as when the vehicle is stopped or nearly stopped so that decreased visibility of the identification and/or registration information does not occur when the vehicle 10 is moving at a substantial speed; however, the additional functionality of displaying the message when the vehicle is at the second speed still remains. Additionally, the message may provide an undesired distraction for a party outside of the vehicle 10 while the vehicle 10 is in motion, and thus, by only displaying the message while the vehicle is stopped or nearly stopped, the possibility of distraction may be substantially reduced. However, the processor 130 may alternatively operate the display 110 in the first and second operational modes at any other suitable speed arrangement. In a variation of this, the display system 100 may enhance legibility of the information for a party outside of the vehicle 10 by horizontally mirroring content rendered on the display 110 when the display 110 is mounted on the front exterior of the vehicle 10; in this variation, content rendered on the display may be read in the correct orientation by a party viewing the display 110 in a rearview or side mirror of a second vehicle located ahead of the vehicle 10. However, the processor may render content on the display 110 by any other means or arrangement such that distraction caused by the display 110 is reduced and legibility of the displayed content is improved.

As described above, the processor 130 preferably functions to operate the display 110 in the third operational mode when the vehicle 10 is off. The third operational mode preferably displays identification and registration information of the vehicle 10 at a second lower power consumption level that is less than the first power consumption level. In a variation of this, a message is rendered on the display 110 in addition to the identification and registration information of the vehicle 10, although any one or combination of a message, identification information of the vehicle 10, registration information of vehicle 10, or any other information may be rendered on the display 110 when in the third operational mode. When the vehicle 10 is off, the power available to the display system 100 may be less than when the vehicle is on. For example, in the variation wherein the display system 100 obtains power from a power source of the vehicle 10, the display system 100 may be utilizing energy that was stored from another period of time when the vehicle was on. Thus, there is a limited supply of power, and by operating the display 110 at a lower power consumption level in the third operational mode than in the first and/or second operational modes while the vehicle is off, the length of time that content may be rendered on the display 110 may be increased for a given amount of energy available to the display system 100.

The operation of the display 110 in the third operational mode may reduce the power consumption of the display system 100 in a variety of arrangements. In a first variation, the display 110 may be turned off at a first time and turned on at a second time. The display 110 may be timed to cycle on and off at specific time intervals, for example, every five minutes. The driver, the owner, or any other suitable party may adjust the intervals. This allows the display 110 to be turned off for a length of time and turned on for another length of time. The length of time that the display 110 is turned off is preferably substantially longer than the length of time that the display 110 is turned on, which substantially decreases the power consumption of the display 110. In a further variation, when in the third operational mode, content may be rendered on the display 110 in colors that require less power to display, as compared to when operating in the first operational mode. However, the processor may operate the display 110 by any other means that reduces power consumption of the display 110 when in the third operational mode, as compared to the first operational mode. Furthermore, the processor 130 may reduce the power consumption level of the processor 130 when in the third operational mode, for example, by reducing clock speed, shutting down auxiliary functions such as transmitting data to and/or receiving data from the communications device 140, or any other method to reduce power consumption of the processor 130. When the processor 130 operates the display in the third operational mode, the light intensity of the display 110 may be substantially identical to the light intensity of the first and/or the second operational modes. Alternatively, because the vehicle 10 is presumed to be stationary when off (a possible exception to this presumption would be when the vehicle 10 is being towed) and the party to which message and/or identification information and/or registration information is to be shown is substantially proximal to the vehicle 10, the light intensity of the display 110 may be substantially less in the third operational mode than in the first and/or second operational modes. However, any other suitable light intensity may be used in the third operational mode.

In a second variation, the display may be continuously on when operating in the third operational mode but at a substantially lower light intensity than in the first and/or second operational modes. In a first example, the backlight of the display 110 may be at the lowest light intensity in the third mode. In a second example, in the variation of the display 110 that is e-ink, the backlight of the display 110 may be turned off, allowing only the e-ink, which is bistable and does not require additional power to maintain, to be visible. The method and arrangement to decrease the power consumption of the display 110 in the third operational mode is preferably one of the two above variations, but may alternatively be a combination of the above variations or any other suitable method or arrangement.

The processor 130 may alternatively operate the display 110 in a fourth operational mode. The fourth mode may be determined by communication through the communication device 140. In a first example, the communication device 140 may communicate with a law enforcement agency and may indicate to the processor 130 that the vehicle 10 has been stolen. The processor 130 may then operate the display 110 in a fourth operational mode in which a notification that the vehicle 10 is a stolen vehicle is rendered on the display 110. However, the fourth mode may alternatively be of any other suitable type and actuated by any other suitable method.

The communication device 140 functions to allow content, information, and/or data to be transferred to and from the display system 100. The communication may be conducted with an official organization (such as a DMV office or a law enforcement agency), a content database, the driver of the vehicle, the owner of the vehicle, or any other suitable party. The communication device may transmit and/or receive information regarding vehicle identification and/or registration information, vehicle maintenance information, driver information, vehicle location information (for example, in the variation of the display system 100 that includes a GPS location device or accesses GPS location services), updated advertisements, or any other suitable type of information. The communication device 140 is preferably of a wireless communication type, for example, one that communicates with cellular phone towers, Wi-Fi hubs, or any other suitable type of wireless communication. However, the communication device 140 may be a wired communication device. In this variation, updated information is transferred when the display system 100 is "plugged in" to an updating device, for example, a computer at a maintenance facility, at a DMV office, or any other suitable location, or another vehicle and/or display system 100 that has wireless communication capabilities. The communication device 140 may also include a communication processor that functions to interpret communications to and/or from the display system 100. The communication processor is preferably separate from the processor 130, but may alternatively be the processor 130. The communication processor may function to encrypt and/or decrypt communications to and/or from the display system 100. The encryption/decryption may be any one of a variety of authentication and encryption schema. For example, cryptographic protocols such as Diffie-Hellman key exchange, Wireless Transport Layer Security (WTLS), or any other suitable type of protocol. The communication processor may also function to encrypt data to encryption standards such as the Data Encryption Standard (DES), Triple Data Encryption Standard (3-DES), or Advanced Encryption Standard (AES). However, the communication device 140 may allow any other suitable type of communication and may be of any other suitable arrangement.

The communication device 140 may receive content, information, and/or data from a content database. Preferably, the content database is arranged substantially remote from the processor 130. The content database also preferably contains content provided by an institution, for example, an advertiser, a school, a record company, or a sports team or venue; content provided by the institution preferably includes advertisements. Alternatively, the content database may contain content provided by the driver and/or owner of the vehicle 10, for example, a message composed by the owner of the vehicle 10 congratulating a child upon graduation from high school. However, any other suitable party may provide content to the content database, and the content database may include a combination of advertisements from one or more institutions and personal messages from one or more individuals. In a first example, content on the content database is accessed by the processor 130 via the communication device 140 and stored on the storage device 150. Preferably, the storage device 150 is arranged substantially proximal to the display 110, such as within the vehicle 10 or within a housing containing the display 110; however, the storage device 150 may be located remotely from the vehicle 10, such as on a hard drive connected to a remote server. In a second example, content on the content database is accessed via the communication device 140 in real time and then rendered on the display 110, thereby bypassing storage of content on the storage device 150. However, content from the remote message database may be accessed by any other means before being rendered on the display 110. In a third example, the storage device also functions as the content database, wherein content from at least one institution or individual, such as those listed above, may be stored on the storage device and also selected by the driver and/or owner of the of vehicle 10 to be rendered on the display 110. In this variation, the storage device 150 of the display system 100, also functioning as a content database, may be accessed by a second display system separate from the display system 100, such as a display system arranged on a second vehicle. However, any other suitable party may select the content to be rendered on the display 110 from the content database. Furthermore, content on the content database may be selected, accessed and/or modified by the driver and/or owner of the vehicle 10, or any other suitable party, via an interface. Preferably, the interface is internet-based and accessible via a web browser, for example, on a mobile smart phone or on a computer. In a first example, the driver and/or owner of the vehicle 10 may access interface with an internet-capable mobile phone, then log into the content database and select content (for example, a San Francisco Giants Baseball banner) he wishes to be rendered on the display 110. In a second example, the content database stores vehicle registration information, and upon the renewal of the registration of the vehicle 10, a DMV representative may access the content database via a computer equipped with the interface and then update the registration information of the vehicle 10 on the content database; the communication device 140 may then retrieve the updated registration information from the content database and the registration information subsequently rendered on the display 110 may reflect the renewal. Alternatively, the interface may be a handheld device that is hardwired, or physically "plugged in", to the display system 100. In this variation, the interface may or may not be removable from the display system 100. Furthermore, the interface may not couple to the content database via the communication device 140, but instead only provide the driver and/or owner of the vehicle 10, or any other suitable party, to access content already located on the display system 100, such as on the storage device 150 arranged substantially proximal to the display 110. For example, a law enforcement officer, upon pulling over the driver of the vehicle 10 for a traffic violation, may hook up to the display system 100 arranged on the vehicle 10 a device equipped with the interface, wherein the interface provides access to the current identification and/or registration information of the vehicle 10. However, the interface may permit access to any content contained in any other device coupled to the display system 110 and by any other means.

The communication device 140 may transmit data regarding the rendering of a particular content on the display 110. Preferably, an advertisement is included in the content rendered on the display 110, and the communication device 140 transmits data regarding the rendering of the advertisement on the display 110. This data may include, for example, how long the advertisement was displayed, when it was displayed, and where it was displayed. Alternatively, this data could be collected and/or stored by the processor 130, although it could be collected and stored by any other device or means. Preferably, this information is used to determine the magnitude or type of an award granted to the driver and/or owner of the vehicle 10. In a first example, if an advertisement for tickets to a baseball game featuring a given team is rendered on the display 110, the driver and/or owner of the vehicle 10 may receive a monetary award commensurate with the length of time that the advertisement was rendered on the display 110; alternatively, the owner and/or driver of the vehicle 10 may receive one or more tickets to a baseball game featuring this team in return for displaying the advertisement in an area with a relatively low attendance at baseball games. However, any other method may be used to grant an award of any other type to the driver and/or owner of the vehicle 10 in return for the rendering of content on the display 110.

The sensor for determining the proximity of the vehicle 10 to a second vehicle functions to indicate to the processor 120 to modify content rendered on the display 110. The processor 120 preferably renders a message, such as an advertisement, on the display 110 when the second vehicle is substantially proximal to the vehicle 10 (such as in the second mode); the processor 120 preferably renders the identification and registration information of the vehicle 10 on the display 110 when the sensor detects that no second vehicle is substantially proximal to the vehicle 10 (such as in the first mode or the third mode). The sensor may be a RADAR detector, a LIDAR detector, an IR transmitter-photoresistor pair, a camera, or any other suitable device configured to detect the proximity of the vehicle 10 to a second vehicle. In the embodiment of the sensor that is a camera, the camera may be configured to detect identification information of the second vehicle (such as the license plate number of the second vehicle); this information may be used to determine the owner of the second vehicle and obtain information relating to the owner of the second vehicle. The processor 120 may then modify content rendered on the display 110 based upon the demographic of the owner of the second vehicle, such as by displaying an advertisement for discount prescription medications if the owner of the second vehicle is determined to be at least sixty years of age; by displaying an advertisement for a women's fashion store if the owner of the second vehicle is determined to be female; or by displaying driver information if the second vehicle is determined to be owned by or used by a law enforcement agency. In this example, identification information of the second vehicle may be transmitted to a database of vehicle identification information, wherein the database returns information about the owner of the second vehicle 10, such as age, ethnicity, or gender; the database may be maintained by an entity such as a DMV or the American Automobile Association (AAA). Alternatively, the camera may be configured to determine directly the demographic of the driver of the second vehicle (for example, by matching the driver to a specific ethnicity by with facial recognition software) or the response of the driver of the second vehicle to a message rendered on the display 120. In the latter example, the response of the driver of the second vehicle may be used to pick an alternative message that may produce a more favorable response if the initial response is negative, or to choose a similar message if the first response is positive. Furthermore, in the embodiment in which the sensor is a camera, the camera may be used to measure the level of ambient light substantially proximal to the vehicle 10 such that content may be rendered on the display at an appropriate light level; for example, the brightness of the display may increase if the camera determines a high level of sunlight near the vehicle 10. However, the sensor may detect any other information relevant to the second vehicle and indicate to the processor 120 to modify content rendered on the display based upon any other variable.

Figure 2:
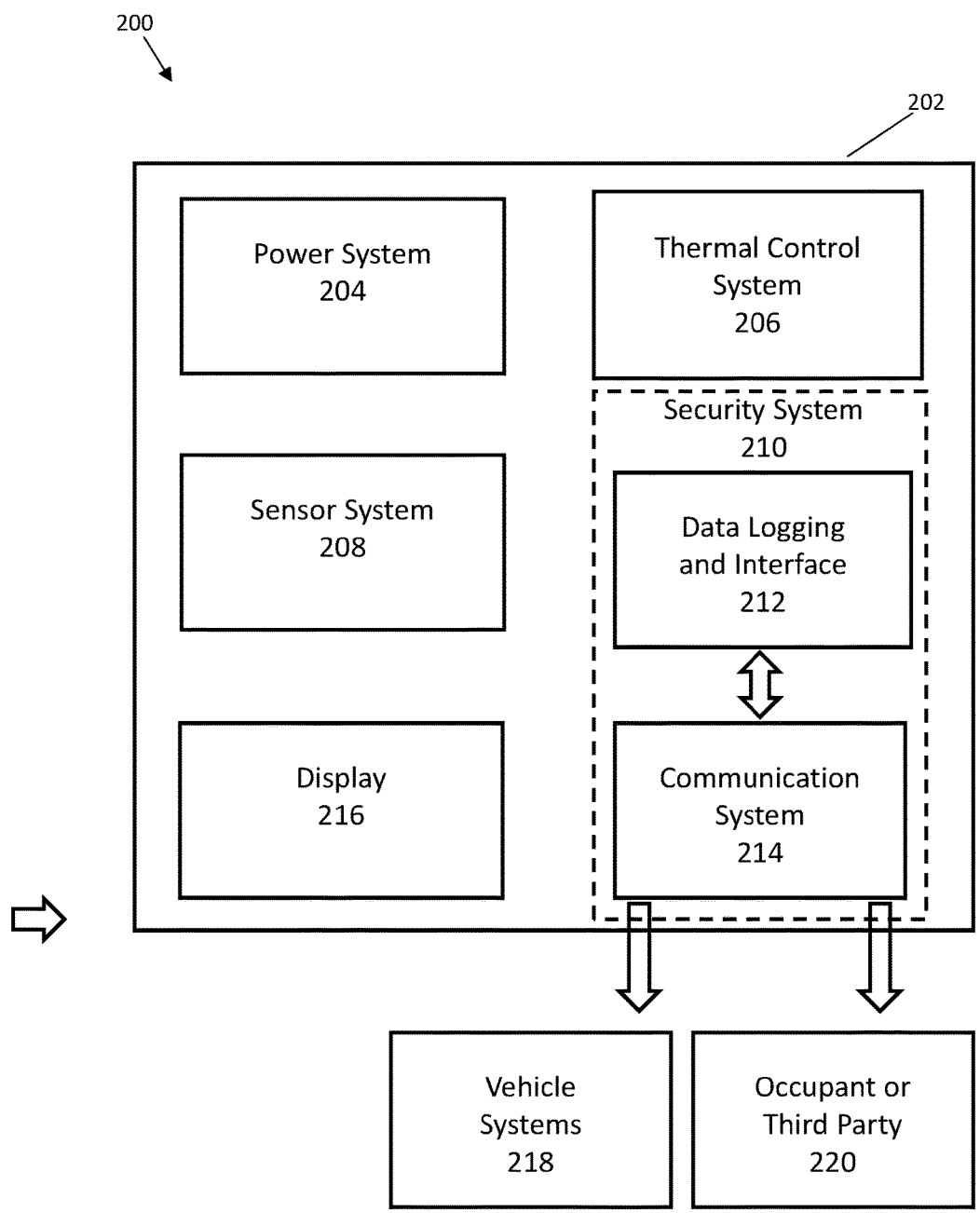
FIG. 2 is illustrates various systems in a digital license plate system.

FIG. 2 illustrates various systems, sub-systems, or modules that can be incorporated into a digital license plate system 200, along potential interacting agents such as vehicle systems 218, vehicle occupants, or third party persons or automated systems 220. In this Figure, a digital license plate 202 can be mounted on a vehicle. Systems within the digital license plate can include, but are not limited to, a power system 204, thermal control system 206, and sensor system 208. An electronic security system 210 limits unauthorized access to data logged and distributed via a data logging and interface system 212, or any received/transmitted communications through communication system 214. Received data can be used to determine or update information presented by display 216.

Figure 3:
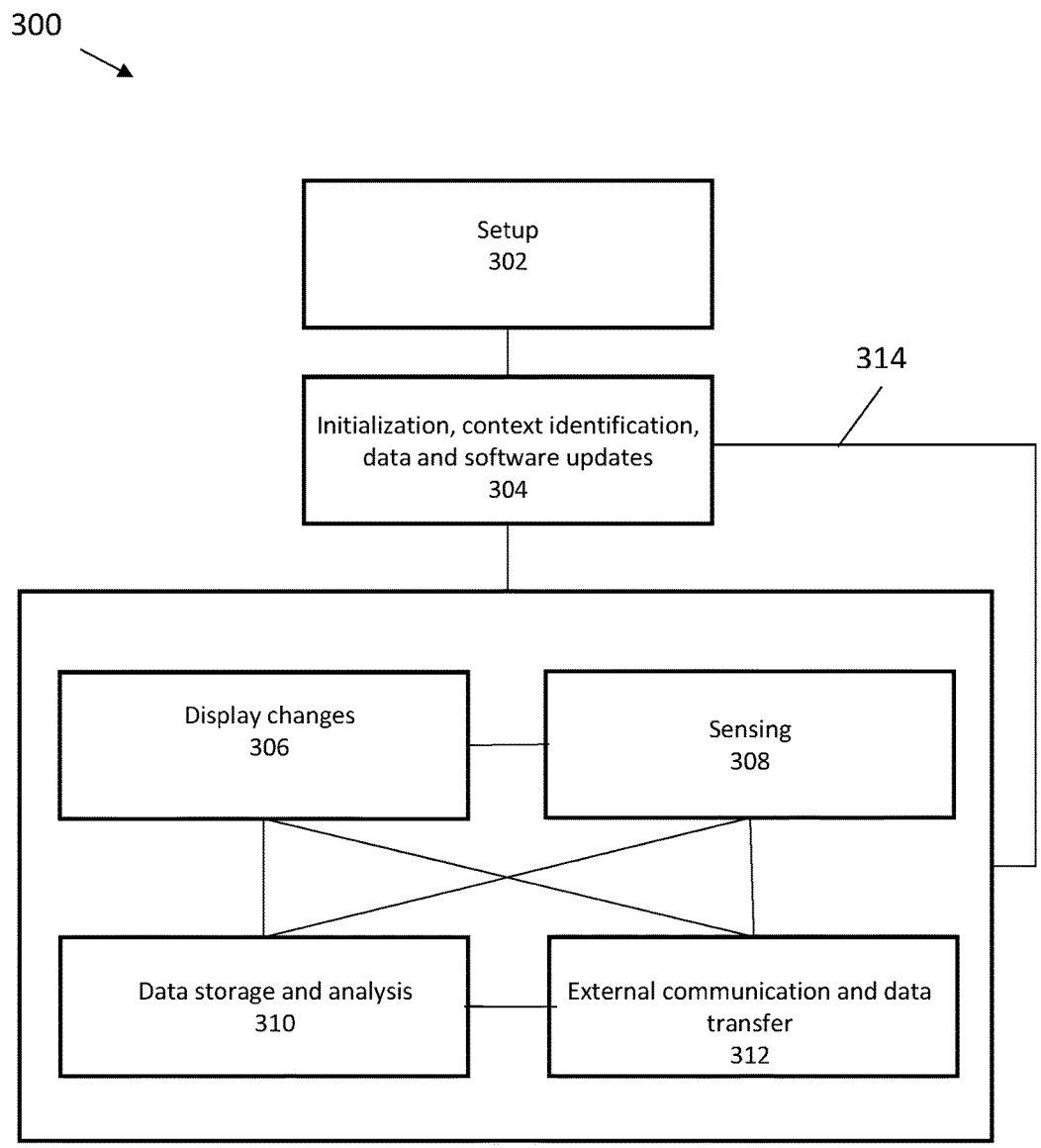
FIG. 3 illustrates operation of a digital license plate system.

FIG. 3 illustrates a method for operation of one embodiment of a digital license plate system. After an initial setup 302 to register and link a digital license plate to a specific vehicle, the digital license plate can be ready for initialization 304 on vehicle startup (or alternatively, on vehicle stop), and can use timers or sensors to help identify context, location, or display presets for the digital license plate. Data uploading/downloading can be initiated, and any firmware/software updates completed. In normal operation, changes 306 to the display can occur in response to sensed data 308, from data storage or analysis system 310, or as a result of external communication and data transfer 312. Similarly, sensed or stored data can be transmitted or received, and the sensors activated, deactivated, or sensor data analyzed based on internal triggers or externally received data. When a vehicle stops, or in response to a timing or other suitable trigger, data can be transferred (via line 314) back to the initialization step 304.

Figure 4A:
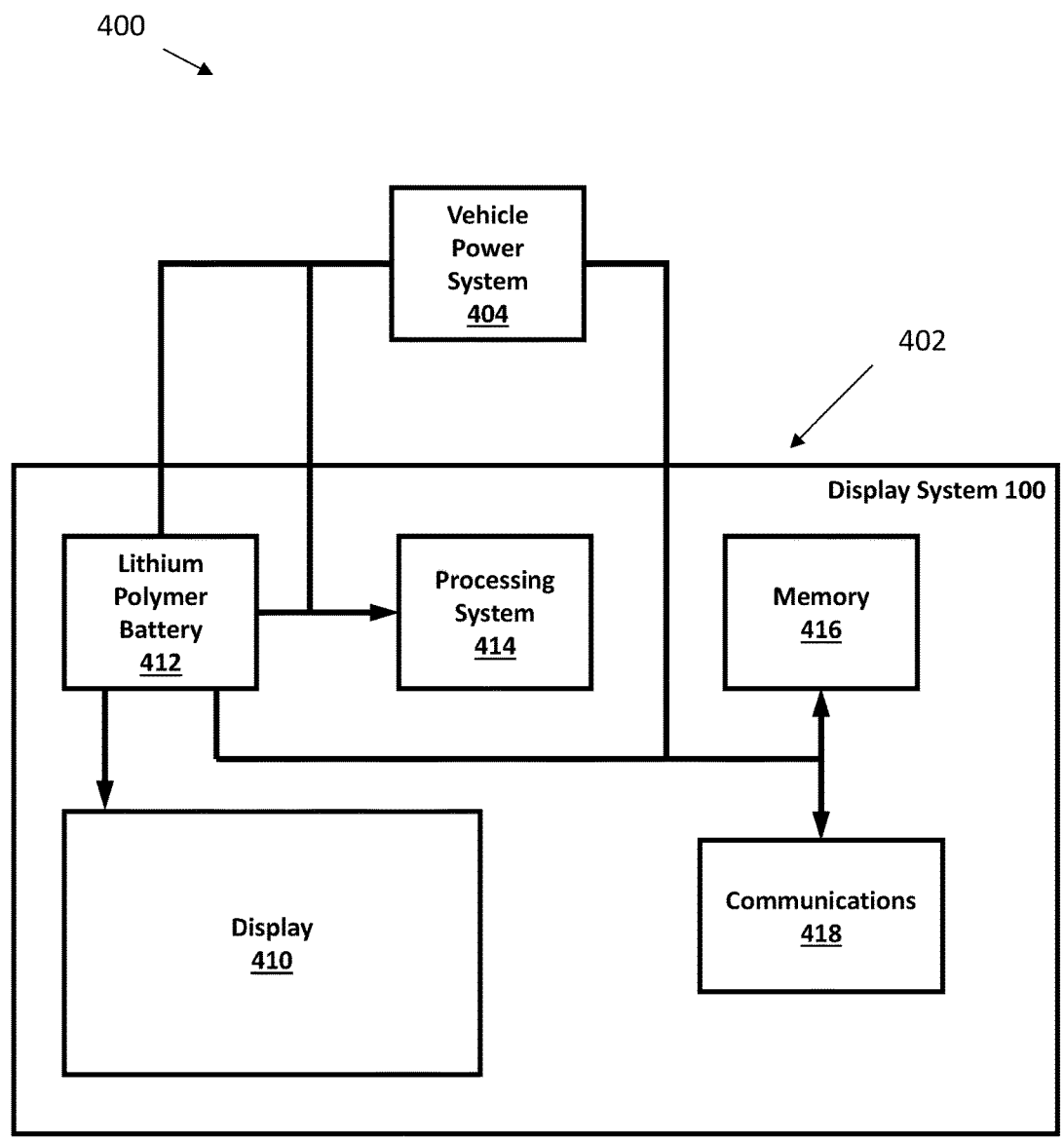
FIG. 4A is an embodiment of an on-module battery power system.
Figure 4B:
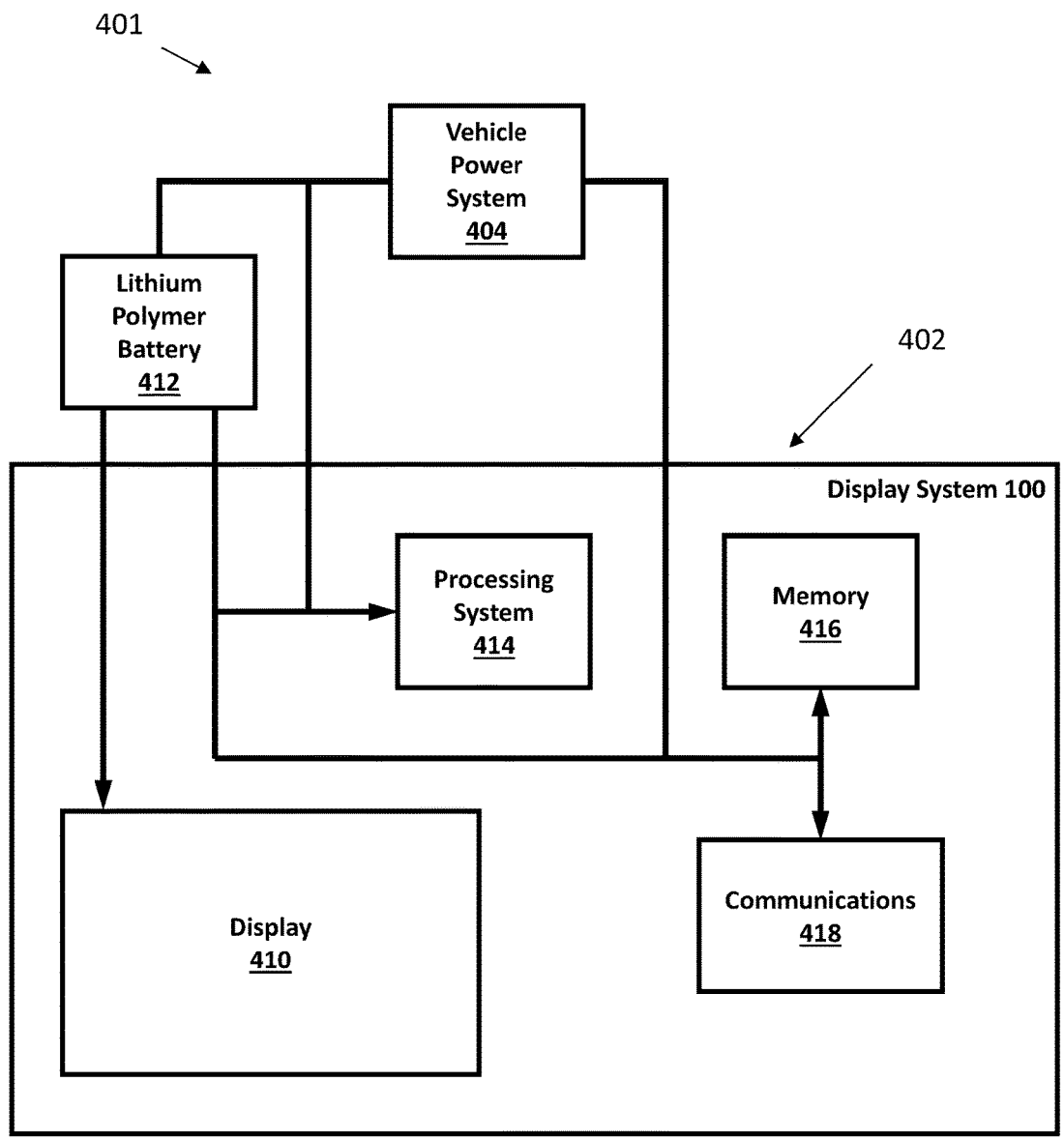
FIG. 4B is an embodiment of an off-module battery power system.

FIG. 4A depicts one embodiment of display system 400 showing selected components. Mounted within an externally attachable module 402 is a battery 412 to supply power to a processing system 414, a memory module 416, a communications module 418 and display 410. Power can also be supplied by a vehicle power system 404, either directly or via recharge of the battery 412. In some embodiments, battery 412 may be a lithium polymer, a nickel-cadmium, lead acid, Lithium Ion, Lithium Air, Lithium Iron Oxide, Nickel Metal Hydride, absorbent glass mat (AGM), or a valve-regulated lead-acid (VRLA) battery. FIG. 4B shows display system 401, an alternative to that depicted in FIG. 4A. In that embodiment, the battery 412 can be positioned within the vehicle, external to externally attachable module 402. Advantageously, this can allow use of larger batteries, or batteries of differing chemistries, including conventional rechargeable lead-acid batteries.

When a vehicle associated with display system 400 is powered on, the display system 400 is normally supplied with power from the vehicle systems. In some embodiments, the power supplied to display system 400 by vehicle systems may be of 12V. In other embodiments, other voltage values may be implemented. When the vehicle is powered off, display system 400 may still need to be powered on to display, for example, vehicle registration information. In some embodiments, display system 400 may need to be powered on substantially all the time. During the vehicle powered off state display system 400 draws power from battery 412.

Figure 5:
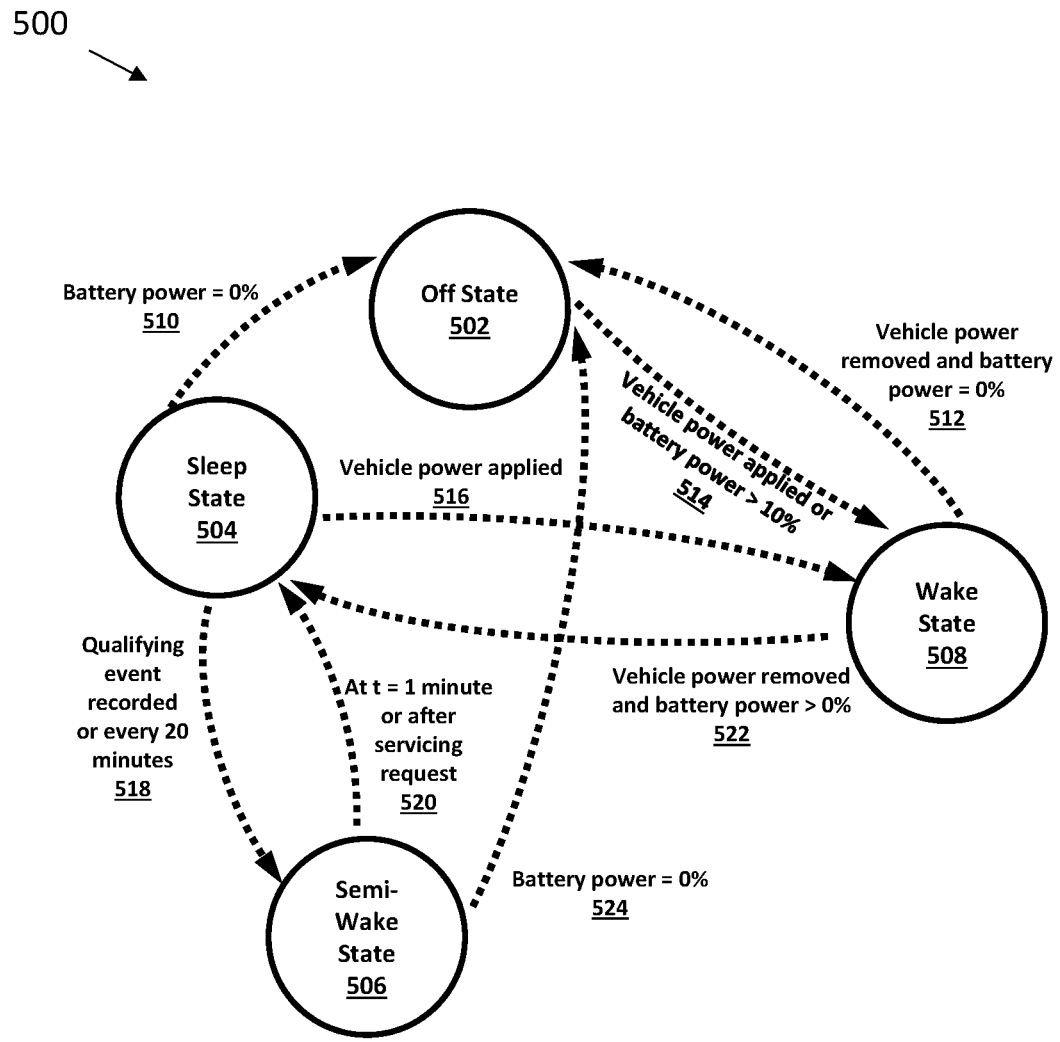
FIG. 5 is a state diagram for a power system.

As seen with respect to FIG. 5, position on a power state chart 500 for a display system 400 can depend on the availability and requirements of electrical power. Four states are described as associated with display system 100, including an:

Off state: Display system 400 is switched off, no processes are running

Sleep state: In this state, only a minimal number of processes are running, for example:
1. Real Time Clock
2. Capacitive Touch Monitoring
3. Accelerometer Monitoring In some embodiments, an infrared sensor may be used to detect motion around the digital display to trigger a wake state. In other embodiments, the processor may cause the plate to wake up at regular intervals.

Wake state: In this state, all device processes associated with display system 100 are running, including the processor, the communication module (including the cellular communication module, the Wi-Fi module, and the Bluetooth module), the digital display, the accelerometer, the gyroscope and the speed sensor.

Semi-wake state: In this state, all processes associated with the sleep state are running (as described above) and in addition, an image is displayed on display 110. In some embodiments, processing system 414 and a modem (not shown) may be powered up, with the modem being used to implement wireless connectivity (e.g. 3G or 4G cell service) to a remote server (not shown) by methods including but not limited to wireless internet access. Other processes could include back/front light control, or light/dark detection.

Transitions between states are initiated in response to battery and vehicle power levels, sensed capacitive touch, an accelerometer event (motion sensed), a cable disconnect (vehicle power disconnected), incoming SMS message (received via the modem), a timer signal, or infrared motion detection. Specifically, some transition triggers are described as follows:

Vehicle Power Removed

When 12V vehicle power is removed from the device, and the battery has sufficient charge (>10%) display system 400 will enter into sleep state. This transition will happen within 60 seconds. When the battery is fully discharged, the device will completely turn off.

Vehicle Power Applied

When 12V vehicle power is applied display system 100 will immediately go into wake state.

Capacitive Touch Recorded

When a touch is sensed display system 100 will transition from sleep to semi-wake state.

Accelerometer Event Sensed—When the accelerometer detects that the display system has been removed from a stationary vehicle.

In some embodiments, display system 400 transitions from sleep state to semi-wake state every 20 minutes, stays in semi-wake state for 1 minute, and then returns to sleep state. In other embodiments, other timing combinations may be implemented depending on the nature of the application. For example, display system 400 may transition from sleep state to semi-wake state every 60 seconds, stay in semi-wake state for 10 seconds, and then return to sleep state.

Returning to FIG. 5, starting from an off state 502 where all systems are powered down, if a condition where vehicle power is applied or battery power is greater than 10% 514 occurs then the system transitions to a wake state 508. If, from wake state 508, a condition where vehicle power is removed or battery power is 0% 512 occurs then the system transitions to off state 502. While in wake state 508, if a condition where vehicle power is removed and battery power is greater than 10% 522 occurs then the system transitions to sleep state 504. Conversely, while in sleep state 504, if a condition where vehicle power is applied 516 then the system transitions to wake state 508. While in sleep state 504, if a condition where battery power is 0% 510 occurs, then the system transitions to off state 502. While in sleep state 504, if a condition where a qualifying event is recorded (for example, a capacitive touch or infrared motion detection as discussed above) or 20 minutes have elapsed since a last state check 518, the system transitions to semi-wake state 506. If a condition occurs where the system is in semi-wake state 506 and 1 minute has elapsed or when the function associated with the qualifying event (recorded in step 518) is fulfilled 520 then the system transitions to sleep state. If a condition occurs where the system is in semi-wake state 506 and the battery power is 0% 524 then the system transitions to off state 502. The flow diagram in FIG. 5 captures the basic state flow process for digital display 100.

Figure 6A:
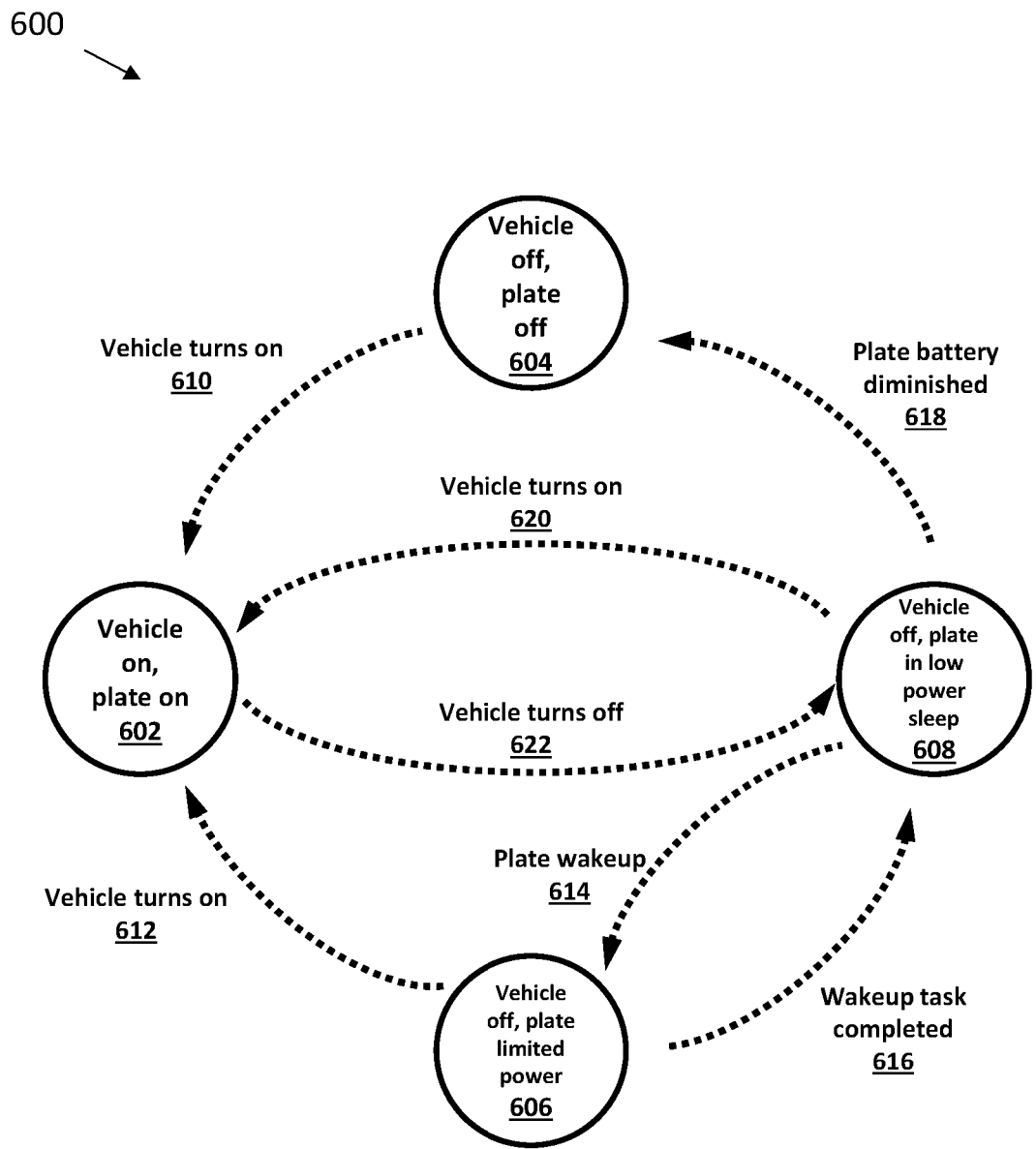
FIG. 6A is a power state diagram for an electrophoretic display.

FIG. 6A is a power state diagram 600 for an electrophoretic display. An electrophoretic display, also known as a bistable display, retains its state when external power is removed. In FIG. 6A, the term "plate" is used synonymously to refer to display system 100. Starting at a state where the vehicle is off and the vehicle power is off 604, if an event where the vehicle turns on 610 occurs, then the system switches to a state where the vehicle is on and the plate is on 602. If, in the state where the vehicle is on and the plate is on 602, an event occurs where the vehicle turns off 622, then the system transitions to a state where the vehicle is off, and the plate is in a low-power sleep mode 608. When the system transitions to the state where the vehicle is off, and the plate is in a low-power sleep mode 608, if the digital display 110 is an electrophoretic display, then the information on the display stays static and does not get erased. If the system is in a state where the vehicle is off, and the plate is in a low-power sleep mode 608 and the vehicle turns on 620, then the system transitions back to the state where the vehicle is on and the plate is on 602. If the system is in a state where the vehicle is off, and the plate is in a low-power sleep mode 608 and an event occurs where the plate battery power is diminished 618, then the system transitions to the state where the vehicle is off and the vehicle power is off 604. If the system is in a state where the vehicle is off, and the plate is in a low-power sleep mode 608 and an event occurs where a plate wakeup signal is received 614, then the system transitions into a state where the vehicle is off and the plate operates under limited power 606. Wakeup signals are triggered by any combination of sensed capacitive touch, an accelerometer event (motion sensed), a cable disconnect (vehicle power disconnected), incoming SMS message (received via the modem), a timer signal, or infrared motion detection. If the system is in a state where the vehicle is off and the plate operates under limited power 606 and an event occurs where a wakeup task is completed 616, then the system transitions to a state where the vehicle is off, and the plate is in a low-power sleep mode 608. If the system is in a state where the vehicle is off and the plate operates under limited power 606 and an event occurs where the vehicle turns on 612, then the system transitions into the state where the vehicle is on and the plate is on 602.

Some embodiments of display system 100 may include modules, or system components, such as a CPU module configured to perform data processing operations, a modem configured to implement communication protocols, a screen associated with digital display 110, a front light system used to illuminate a screen comprised of a bistatic display or a backlight system used to illuminate a screen comprised of an LCD display or some combination of these, a GPS module for positioning, and an On-Board Diagnostics, version II (OBD-II) connection. Each of these modules consumes power, and is affected by system transitions from one state to another.

FIG. 6B presents a table 601 showing how power states affect system components. As seen in FIG. 6B, when the system is in state 602, the CPU is on, the modem is connected, information on the screen is changeable, the front light is on (to illuminate the screen), the GPS module is on, and the OBD-II connection is on. When the system is in state 604, the CPU is off, the modem is off, the information on the screen is frozen on the last image (this information persists since the display is bistable—for example, an electrophoretic display), the front light is off, the GPS module is off, and the OBD-II connection is off. When the system is in state 606, the CPU is on, but operating in a low power mode, the modem is connected, the information on the screen is changeable, the front light is on, the GPS module is off, and the OBD-II connection is off. When the system is in state 608, the CPU is in a suspended mode or low power mode, the modem is in a low power mode, listening, for example, for an SMS wake signal, the information on the screen is frozen on the last image, the front light is off, the GPS module is off, and the OBD-II connection is off.

Figure 7A:
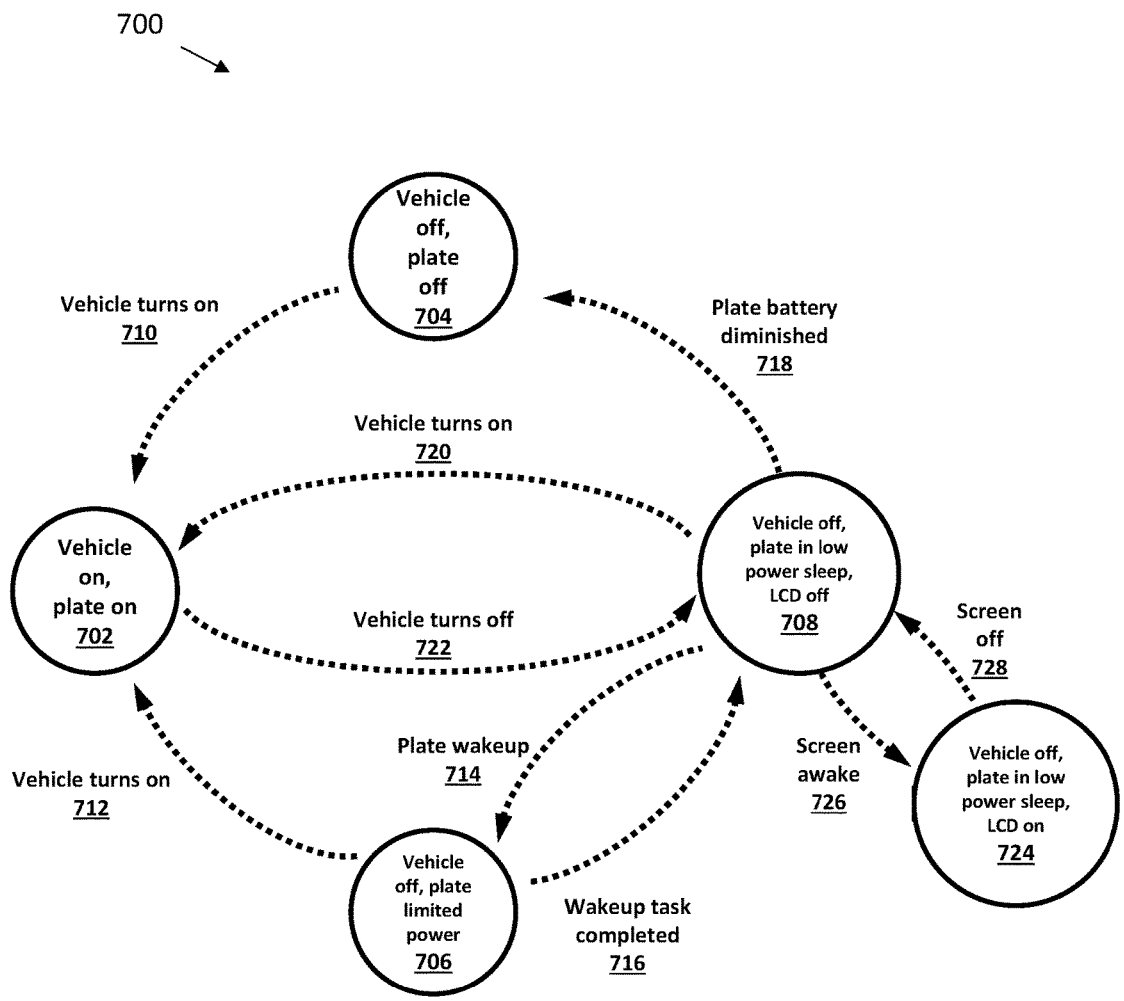
FIG. 7A is a power state diagram for an LCD display.

FIG. 7A is a power state diagram 700 for an LCD display. In FIG. 7A, the term "plate" is used synonymously to refer to display system 100. Starting at a state where the vehicle is off and the vehicle power is off 704, if an event where the vehicle turns on 710 occurs, then the system switches to a state where the vehicle is on and the plate is on 702. If, in the state where the vehicle is on and the plate is on 702, an event occurs where the vehicle turns off 722, then the system transitions to a state where the vehicle is off, and the plate is in a low-power sleep mode 708, and the LCD is off. In the state where the vehicle is off, the plate is in a low-power sleep mode and the LCD is off 708, no information is displayed on the LCD, and the LCD may appear dark. If the system is in a state where the vehicle is off, the plate is in a low-power sleep mode and the LCD is off 708 and the vehicle turns on 720, then the system transitions back to the state where the vehicle is on and the plate is on 702. If the system is in a state where the vehicle is off, the plate is in a low-power sleep mode and the LCD is off 708 and an event occurs where the plate battery power is diminished 718, then the system transitions to the state where the vehicle is off and the vehicle power is off 704. If the system is in a state where the vehicle is off, the plate is in a low-power sleep mode and the LCD is off 708 and an event occurs where a plate wakeup signal is received 714, then the system transitions into a state where the vehicle is off and the plate operates under limited power 706. Wakeup signals are triggered by any combination of sensed capacitive touch, an accelerometer event (motion sensed), a cable disconnect (vehicle power disconnected), incoming SMS message (received via the modem), a timer signal, or infrared motion detection. If the system is in a state where the vehicle is off and the plate operates under limited power 706 and an event occurs where a wakeup task is completed 716, then the system transitions to a state where the vehicle is off, the plate is in a low-power sleep mode and the LCD is off 708. If the system is in a state where the vehicle is off, the plate is in a low-power sleep mode and the LCD is off 708 and the system receives a screen awake command 726, the system transitions to a state where the vehicle is off, the plate is in a low-power sleep mode and the LCD is on 724. When the system is in a state where the vehicle is off, the plate is in a low-power sleep mode and the LCD is on 724, information may be displayed on the LCD. If the system is in a state where the vehicle is off, the plate is in a low-power sleep mode and the LCD is on 724 and the system receives a screen off command 728, then the system transitions to a state where the vehicle is off, the plate is in a low-power sleep mode and the LCD is off 708. If the system is in a state where the vehicle is off and the plate operates under limited power 706 and an event occurs where the vehicle turns on 712, then the system transitions into the state where the vehicle is on and the plate is on 702.

FIG. 7B presents a table 701 showing how power states affect system components. As seen in FIG. 7B, when the system is in state 702, the CPU is on, the modem is connected, the screen is on, the back light is on (to illuminate the screen), the GPS module is on, and the OBD-II connection is on. When the system is in state 704, the CPU is off, the modem is off, the screen is off, the back light is off, the GPS module is off, and the OBD-II connection is off. When the system is in state 706, the CPU is on, but operating in a low power mode, the modem is connected, the screen is on, the back light is on, the GPS module is off, and the OBD-II connection is off. When the system is in state 708, the CPU is in a suspended mode or low power mode, the modem is in a low power mode, listening, for example, for an SMS wake signal, the screen is off, the back light is off, the GPS module is off, and the OBD-II connection is off. When the system is in state 724, the CPU operates in a suspended mode or low power mode, the modem is in a low power mode, listening, for example, for an SMS wake signal, the screen is on, the back light is on, the GPS module is off, and the OBD-II connection is off.

Figure 8:
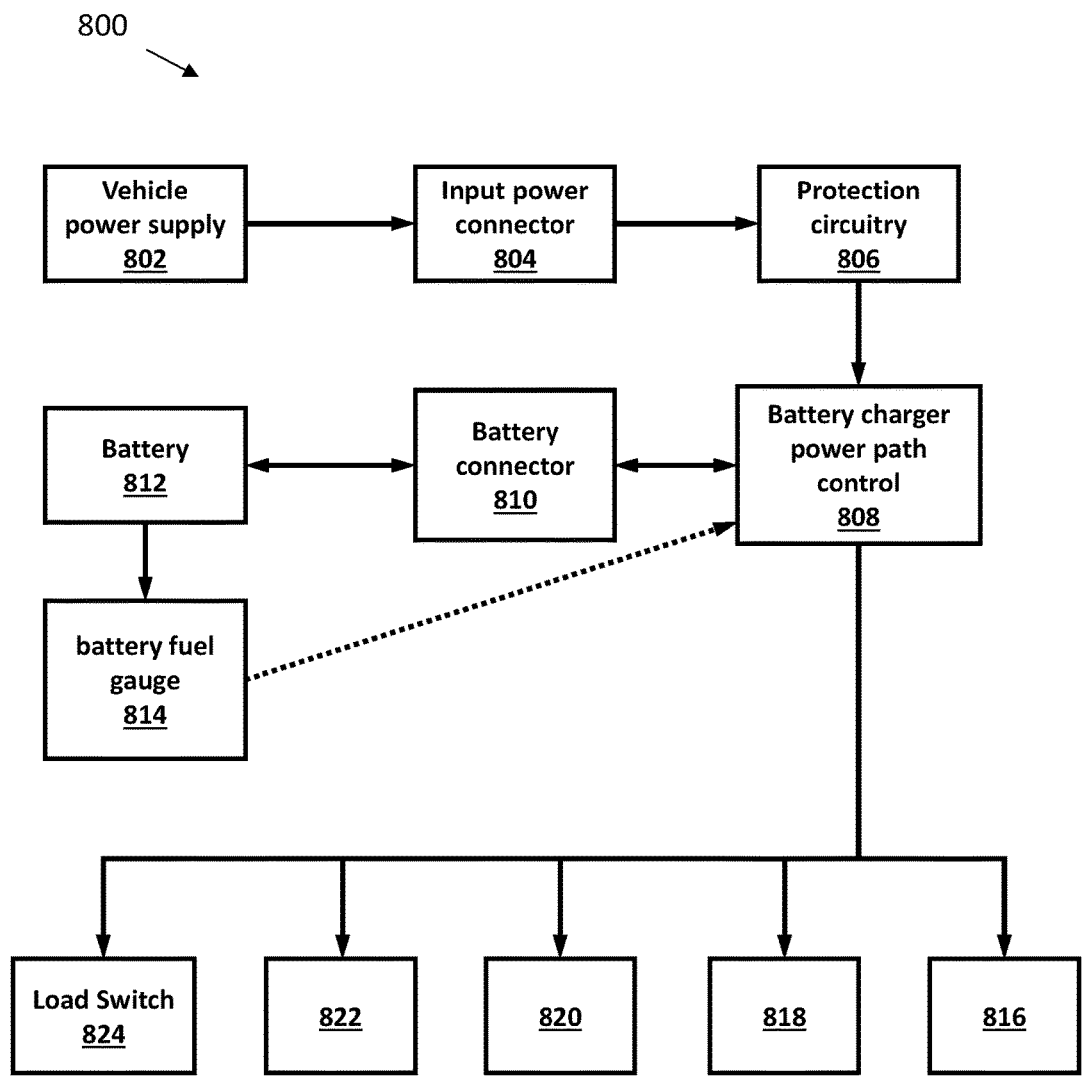
FIG. 8 illustrates an embodiment of a power distribution system.

FIG. 8 is illustrates an embodiment 800 of a power distribution system. In some embodiments, a vehicle power supply module 802 is electrically coupled, via an input power connector 804, to a protection circuitry module 806. Input power connector 804 is a physical connector that allows vehicle power supply module 802 to be appropriately electrically coupled to protection circuitry module 806. Protection circuitry module 806 comprises electrical circuitry configured to prevent undesirable occurrences of electrical phenomena such as overvoltage, reverse voltage, or transients. Protection circuitry module 806 thus prevents overvoltage, reverse voltage or transients from potentially damaging components downstream of the signal chain. Protection circuitry module 806 is electrically coupled to a battery charger power path control module 808. Electrical power from vehicle power supply module 802 is routed to battery charger power path control module 808 via input power connector 804 and protection circuitry module 806.

In some embodiments, a battery 812 is electrically coupled to battery charger power path control module 808 via a battery connector 810. Battery connector 810 is a physical connector that allows battery 812 to be appropriately electrically coupled to battery charger power path control module 808. A battery fuel gauge module 814 is configured to monitor the battery capacity on battery 812.

Battery charger power path control module 808 is configured to route power depending on the state of the system. In some embodiments, when vehicle power supply module 802 is active (for example, when the vehicle is switched on), battery charger power path control module 808 routes electrical power from vehicle power supply module 802 to downstream components. Simultaneously, if the battery capacity associated with battery 812 is less than a predetermined threshold as indicated by battery fuel gauge module 814, a portion of the electrical power from vehicle power supply module 802 may be routed, via battery connector 810, to charge battery 812. On the other hand, when vehicle power supply module 802 is unable to supply electrical power to the system, battery charger power path control module 808 draws power from battery 812 via battery connector 810 to power downstream components, while ensuring that no power from battery 812 is fed back in the direction of vehicle power supply module 802.

In some embodiments, the electrical power output by battery charger power path control module 808 may be distributed to power supporting various voltages, for example, a power generation module 816, a power generation module 818, a power generation module 820, a power generation module 822, and a load switch 824. Power generation module 816 may be, for example, a boost/buck converter, and may be used to power the modem, which may be a cellular modem. Power generation module 818 may be, for example, a boost/buck converter, and may be used to power one or more regulators, where the output of the converter may be used to power the CPU, associated peripherals, and any debug interfaces. The output of the converter may also be used to power certain components of digital display 110. In some embodiments, multiple power generation modules may be implemented, with each power generation module being dedicated to a specific low-dropout regulator (LDO) which, in turn may be dedicated to supplying power to a specific portion of the electrical system. 12V power generation module 820 may a boost/buck converter, and be used to power digital display 110. Power generation module 822 may be, for example, an LDO, the output of which may be used to supply power to certain portions of the electrical circuitry. Load switch module 824 may be used to generate electrical power to supply power to, for example, an ultrasonic transmitter which may be used, for example, for determining relative velocities of objects in the neighborhood of the vehicle.

Figure 9:
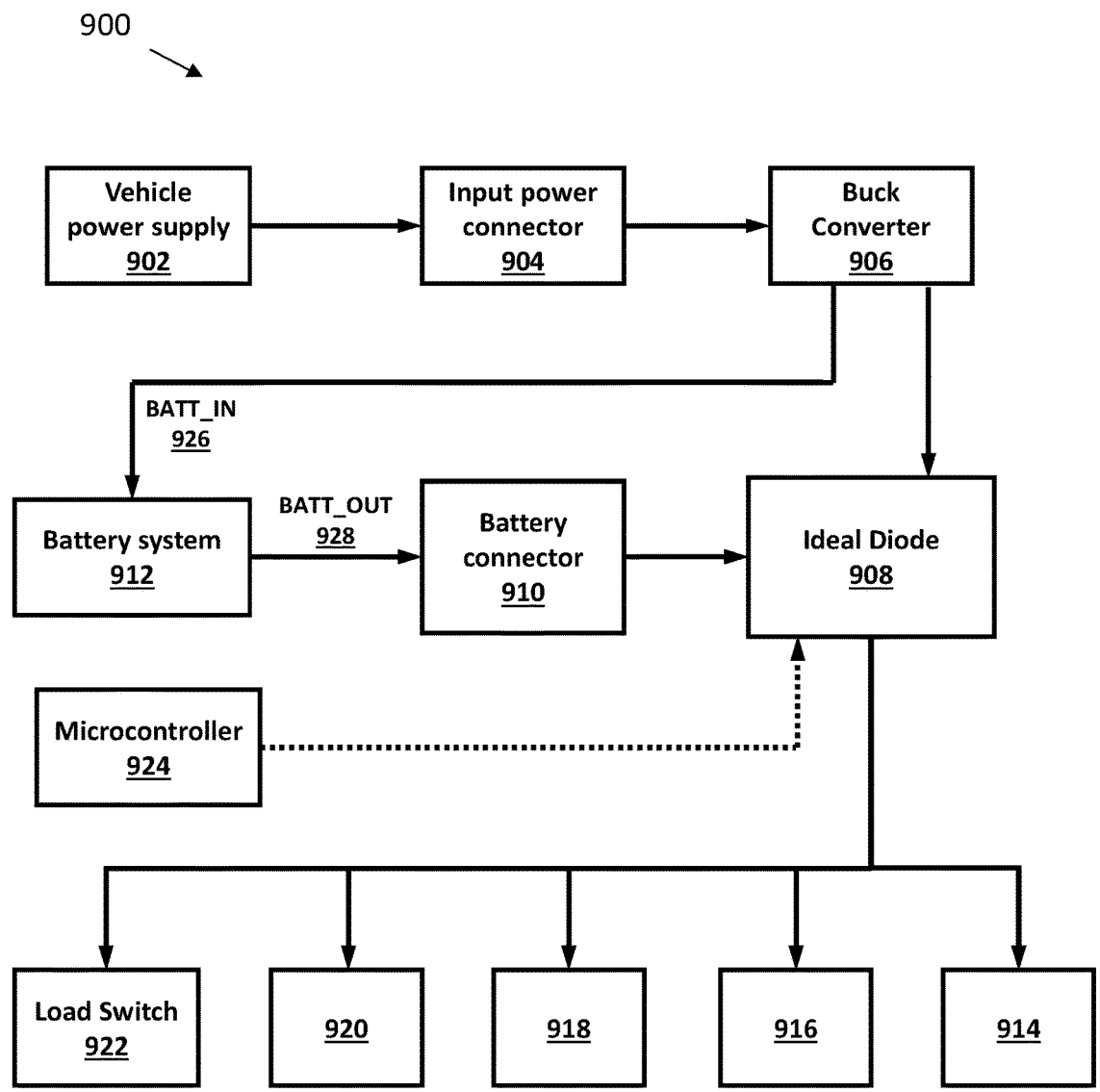
FIG. 9 illustrates an embodiment of a power distribution system.

FIG. 9 illustrates an embodiment 900 of a power distribution system. In some embodiments, a vehicle power supply 902 is electrically coupled to a buck converter 906 via an input power connector 904. Input power connector 904 is a physical connector that allows vehicle power supply 902 to be appropriately electrically coupled to buck converter 906. Buck converter 906 is configured as a DC-to-DC converter that may be configured to step down voltage while stepping up current from a source to a load. Buck converter 906 provides multiple output signals. The first signal can be a BATT_IN signal 926, which is provided to a battery system 912, discussed in detail subsequently. Battery system 912 is configured to generate a BATT_OUT 928 signal which is fed to an ideal diode 908, via a battery connector 910. Battery connector 910 is a physical connector that allows battery system 912, and potentially other signals, to be appropriately electrically coupled to ideal diode 908. Buck converter also generates a second output signal that is fed to ideal diode 908. Ideal diode 908 is configured to produce an output only for positive values of input voltage, and zero output for negative values of input voltage, thus mimicking the ideal theoretical characteristics of a diode. A microcontroller 924 is configured to provide ideal diode 908 an input signal that allows the output of ideal diode 908 to switch between the signal provided by vehicle power supply 902 and battery system 912.

In some embodiments, when vehicle power supply module 902 is active (for example, when the vehicle is switched on), microcontroller 924 configures ideal diode 908 to route electrical power from vehicle power supply module 902 to downstream components. Simultaneously, if the battery capacity associated with battery system 912 is less than a predetermined threshold as indicated by the subsystems of battery system 912 (discussed subsequently), a portion of the electrical power from vehicle power supply module 902 may be routed, via BATT_IN signal 926, to charge batteries associated with battery system 912. On the other hand, when vehicle power supply module 902 is unable to supply electrical power to the system, microcontroller 924 configures ideal diode 908 to draw power from battery system 912 via battery connector 910 to power downstream components, while ensuring that no power from battery system 912 is fed back in the direction of vehicle power supply module 902.

In some embodiments, the electrical power output by ideal diode 908 may be distributed to power, for example, a 3.8V power generation module 914, a 3.3V power generation module 916, a 12V power generation module 918, a 1.8V power generation module 920, and a load switch 922. 3.8V power generation module 914 may be, for example, a boost/buck converter, and may be used to power the modem, which may be a cellular modem. 3.3V power generation module 916 may be, for example, a boost/buck converter, and may be used to power one or more 1.8V regulators, where the 1.8V output of the LDO may be used to power the CPU, associated peripherals, and any debug interfaces. The 1.8V output of the LDO may also be used to power certain components of digital display 110. In some embodiments, multiple 3.3V power generation modules may be implemented, with each 3.3V power generation module being dedicated to a specific LDO which, in turn may be dedicated to supplying power to a specific portion of the electrical system. 12V power generation module 918 may a boost/buck converter, and be used to power digital display 110. 1.8V power generation module 920 may be, for example, an LDO, the output of which may be used to supply power to certain portions of the electrical circuitry. Load switch module 922 may be used to generate electrical power to supply power to, for example, an ultrasonic transmitter which may be used, for example, for determining relative velocities of objects in the neighborhood of the vehicle.

Figure 10:
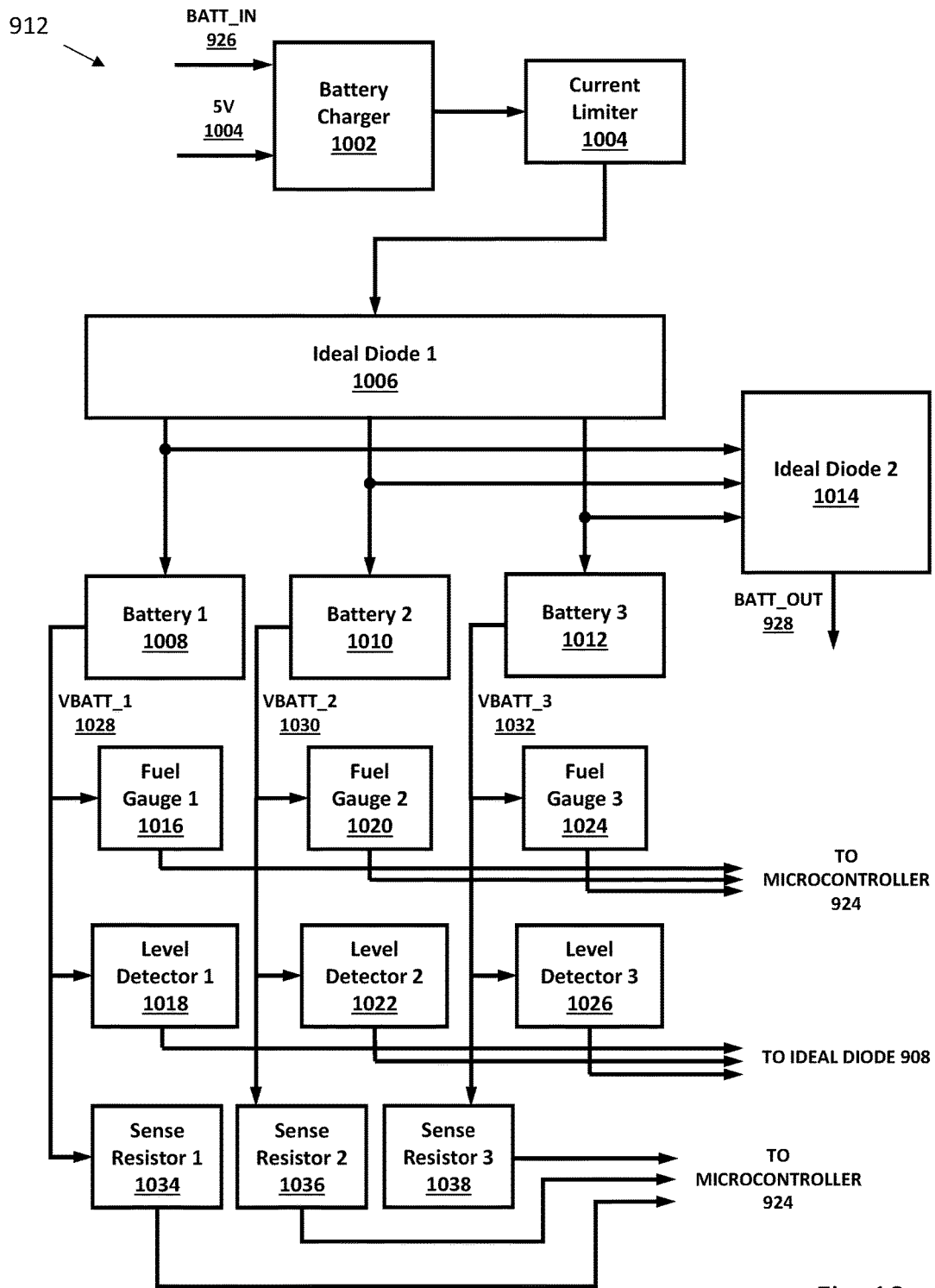
FIG. 10 illustrates an embodiment of a battery system.

FIG. 10 illustrates an embodiment of battery system 912. In some embodiments, battery system 912 includes a battery charger 1002 that is configured to receive the BATT_IN 926 signal. Battery charger 1002 is configured to charge one or more batteries. Battery charger 1002 also receives a 5V signal that may be used to power certain components or subsystems of battery charger 1002. The output of battery charger 1002 is routed to a current limiter 1004, where current limiter 1004 serves to protect downstream circuit components from electric current that exceeds a certain threshold value.

In some embodiments, the output of current limiter 1004 is input to an ideal diode 1 1006. Ideal diode 1 1006 is individually electrically coupled to multiple batteries—in this example a battery 1 1008, a battery 2 1010, and a battery 3 1012. In some embodiments, battery 1 1008, battery 2 1010, and battery 3 1012 may each individually be associated with an individual ideal diode. In other words, ideal diode 1 1006 may be replaced by three individual ideal diodes, each uniquely associated with an individual battery. In other embodiments, battery 1 1008 may be a battery with a rating of 9.6V nominal, 1.1 Ah, while battery 2 and battery 3 may each be a battery with a rating of 9.6V nominal, 10 Ah. As seen in FIG. 10, each individual electrical connection from ideal diode 1 1006 to battery 1 1008—battery 3 1010 is also electrically coupled to an ideal diode 2 1014. When ideal diode 1 1006 is switched off, the outputs of battery 1 1008, battery 2 1010, and battery 3 1012 are routed through ideal diode 2 1014, and any one individual battery output or a combination of battery outputs may be made available at the output of ideal diode 2 as the signal BATT_OUT 928.

In other embodiments, battery 1 1008, battery 2 1010, and battery 3 1020 each produces an output voltage—VBATT_1 1028, VBATT_2 1030, and VBATT_3 1032 respectively. VBATT_1 1028 is routed to a fuel gauge 1 1016, a level detector 1 1018, and a sense resistor 1 1028, where fuel gauge 1 1016 is configured to determine the charge remaining on battery 1 1008, level detector 1 1018 is configured to determine the voltage level of battery 1 1008, and sense resistor 1 1034 is configured to ensure that the battery is not charged or discharged at improper rates. Similarly, VBATT_2 1030 is routed to a fuel gauge 2 1020, a level detector 2 1022, and a sense resistor 2 1030, where fuel gauge 2 1020 is configured to determine the charge remaining on battery 2 1010, level detector 2 1022 is configured to determine the voltage level of battery 1 1008, and sense resistor 2 1036 is configured to ensure that the battery is not charged or discharged at improper rates. and VBATT_3 1028 is routed to a fuel gauge 3 1024, a level detector 3 1026, and a sense resistor 3 1038, where fuel gauge 3 1024 is configured to determine the charge remaining on battery 3 1012, level detector 3 1026 is configured to determine the voltage level of battery 3 1012, and sense resistor 3 1038 is configured to ensure the battery is not charged or discharged at improper rates.

In other embodiments, the individual outputs of fuel gauge 1 1016, fuel gauge 2 1018, and fuel gauge 3 1020 are electrically coupled to microcontroller 924 via a suitable interface such as the inter-integrated circuit (I²C) communication protocol. Also, the individual outputs of level detector 1 1018, level detector 2 1022, and level detector 3 1026 may be electrically coupled to ideal diode 908, while the individual outputs of sense resistor 1 1036, sense resistor 2 1038, and sense resistor 3 may be electrically coupled to microcontroller 924.

Figure 11:
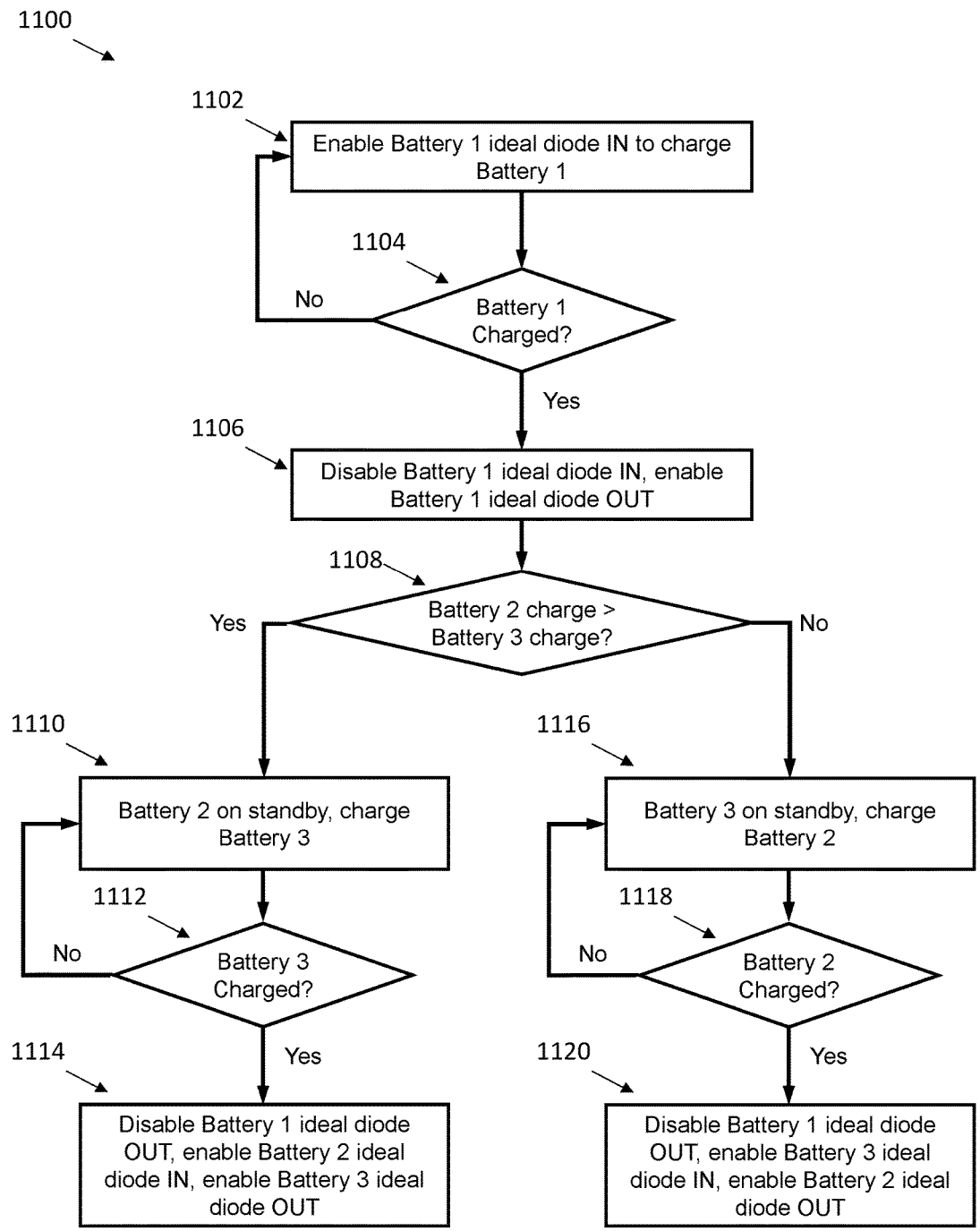
FIG. 11 is a flow diagram illustrating a battery charging method.

FIG. 11 is a flow diagram illustrating one example of a battery charging method 1100. In some embodiments, battery charging method 1100 is associated with charging battery 1 1008, battery 2 1010, and battery 3 1012. As will be appreciated, the particular number of the battery is not critical to practice of the method, and, for example, battery 3 could be checked and charged before battery 1 and 2. At 1102, the method enables the channel of an ideal diode, associated with a battery 1, where the channel is referred to as ideal diode IN, to charge battery 1. At 1104, the method checks to see whether battery 1 is fully charged. If battery 1 is not fully charged, the method returns to 1102. If battery 1 is fully charged, the method goes to 1106, where the channel ideal diode IN associated with battery 1 is disabled, and a channel ideal diode OUT is enabled, where the channel ideal diode OUT allows battery 1 to supply power to any associated circuitry.

At 1108, the method checks to see if the charge on a battery 2 is greater than the charge on a battery 3. If the charge on battery 2 is greater than the charge on battery 3, then the method goes to 1110, where battery 2 is put on standby, while battery 3 is charged. At 1112, the method checks to see if battery 3 is charged. If battery 3 is not charged, the method returns to 1110. If, at 1112, the method determines that battery 3 is charged, the method goes to 1114, where the ideal diode OUT associated with battery 1 is disabled, an ideal diode IN channel associated with battery 2 is enabled (allowing battery 2 to be charged), and an ideal diode OUT channel associated with battery 3 is enabled, allowing battery 3 to supply power to any associated circuitry.

At 1108, if the method determines that the charge on battery 3 is greater than the charge on battery 2, then the method goes to 1116, where battery 3 is put on standby, while battery 2 is charged. At 1118, the method checks to see if battery 2 is charged. If battery 2 is not charged, the method returns to 1116. If, at 1118, the method determines that battery 2 is charged, the method goes to 1120, where the ideal diode OUT associated with battery 1 is disabled, an ideal diode IN channel associated with battery 3 is enabled (allowing battery 3 to be charged), and an ideal diode OUT channel associated with battery 2 is enabled, allowing battery 2 to supply power to any associated circuitry.

Figure 12:
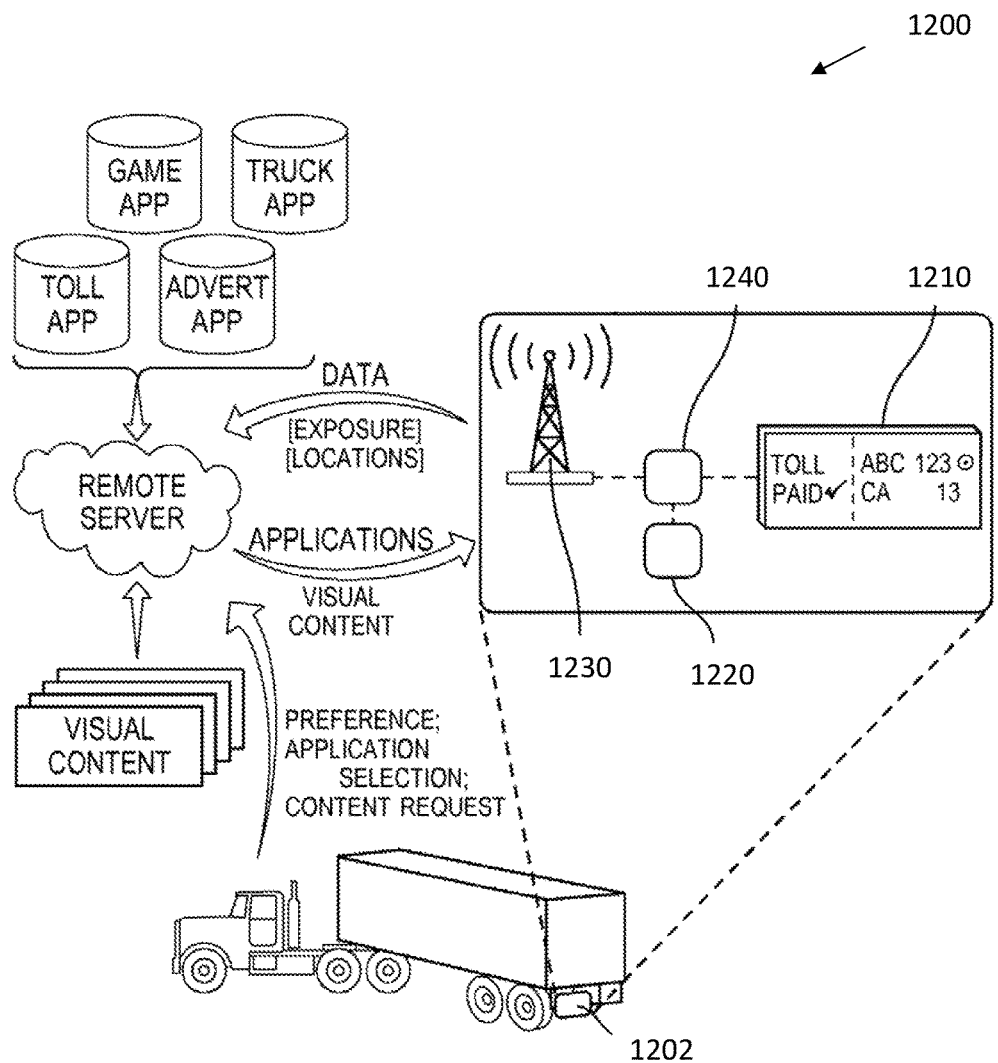
FIG. 12 illustrates external data communication in a digital license plate system.

FIG. 12 illustrates a representative data transfer and storage system 1200 including both vehicle mounted and external apparatus/software for interacting with a digital license plate such as discussed herein. As shown in FIG. 12, a preferred digital license plate system 1202 for rendering content on a vehicle includes a display 1210, a memory 1220, a communication module 1230, and a processor 1240. The display 1210 is configured to mount adjacent an exterior surface of a vehicle. The memory 1220 is configured to store a plurality of executable applications including a vehicle identification application and an application elected by a user. The communication module 1230 is configured to download the user-elected application to the memory 1220. The processor 1240 is configured to selectively execute applications to control visual content rendered on the display 1210, wherein the display 1210 renders vehicle identification information when the vehicle identification application executes, and wherein the display 1210 renders additional visual content when the user-elected application executes.

The digital license plate system 1200 preferably functions to execute a plurality of applications, wherein the display 1210 renders visual content specific to each application for viewing from outside a vehicle. When executing a vehicle identification application, the preferred system 1200 preferably functions as a digital license plate by displaying a government-issued license plate number of the vehicle. However, when executing another (i.e. a user-elected) application, the preferred system 1200 preferably functions as a toll payment, interstate trucking, messaging, advertising, gaming, news, alert, or other application by displaying visual content relevant or specific to the user-elected application. The vehicle identification application is preferably a default and/or preloaded application executable on the system 1200, and additional applications are preferably elected by the user. The additional or user-elected applications are preferably downloaded from a remote server containing a plurality of available applications executable on the system 1200 such that the user can customize the system 1200 to perform certain functions and/or to display certain visual content, types of visual content, forms of visual content, etc. The preferred system 1200 can then switch between displaying vehicle identification information and displaying additional visual content, types of visual content, forms of visual content, etc. specific to the user-elected application. The user can therefore select various applications from a set of available applications to enable certain functionalities of the system 100.

The memory 1220 of the system 1200 is configured to store executable applications, including the vehicle identification application and the application elected by the user. The memory 1220 can preferably store additional user-elected applications, application-specific or application-related data (e.g., vehicle identification information, toll payment information, a user-defined personal message), user preferences (e.g., fonts, visual content types, power settings), or any other relevant information pertaining to the operation of the preferred system 1200. In one variation of the preferred system 1200, the memory 1220 is preloaded with the vehicle identification application and vehicle identification information (e.g., a license plate number) that is unique to the vehicle and/or to the system 1200. In this variation, the vehicle identification information is preferably unalterable.

The memory 1220 is preferably in communication with the processor 1240 such that the processor 1240 can access application data and visual content from the memory 420, execute the application, and push visual content from the memory 1220 to the display 1210 for rendering. The memory 1220 is preferably physically coupled to the processor 1240 and arranged within a housing shared with the display 1210 and the processor 1240. Alternatively, the memory 1220 can be arranged within the vehicle and remote from the display 1210, such as adjacent or physically coextensive with an electronic control module (ECM) integrated into the vehicle. The memory 1220 can alternatively be a remote memory coupled to a remote server, wherein the processor 1240 accesses the remote memory via the communication module 1230 in communication with the remote server. The memory 1220 can alternatively be physically coextensive with memory incorporated into a mobile electronic device carried by the user, such as a smartphone or tablet. However, the memory 1220 can be arranged in any other way relative to the display 1210, and the memory 1220 can be accessed over a wire, via wireless communication (e.g., Wi-Fi, cellular, Bluetooth, RFID), and/or through the communication module 1230 in any other way or according to any other protocol.

The communication module 1230 preferably accesses a remote server that stores a plurality of applications, wherein each application on the remote server can be selected by the user and subsequently downloaded to, uploaded to, installed on, or executed on the preferred system 1200 to enable a particular function defined by each application. In one variation of the preferred system 1200, the remote server functions as an application store through which the user can access or buy applications, wherein the processor 1240 accesses the remote server through the communication module 430 to download an application selected by the user. In this variation, personal user information and/or vehicle identification information is preferably used to automatically bill the user, a fleet manager, or any other entity associated with the vehicle for the purchase of the elected application. In one variation, the communication module 430 communicates directly with a remote server via a wireless communication protocol. In an example implementation, the communication module 1230 communicates with the remote server over a cellular (e.g., 4G cellular) network and downloads the user-elected application over the cellular network. However, the communication module 1230 can wirelessly communicate substantially directly with the remote server, such over Wi-Fi and a local area network connection, Bluetooth, satellite, or any other suitable type of short- or long-range wireless communication protocol. In another variation of the system 1200, the communication module 1230 communicates with the remote server through a wireless-enabled mobile device. In one example implementation, the communication module 1230 includes a port configured to accept a physical wire connectable to a smartphone carried by the user, wherein the smartphone wirelessly accesses and pulls information from the remote server and subsequently uploads the information via the wired connection. In another example implementation, the communication module 1230 communicates with a tablet computer over short-range wireless communication protocol (e.g., Wi-Fi, Bluetooth, RFID, near field communication (NFC), infrared), wherein the tablet computer communicates with the remote server via long-range wireless communication protocol (e.g., cellular, satellite) to transfer information from the remote server to the communication module 1230. In these example implementations, the communication module 1230 preferably receives application-related data from the mobile electronic device substantially in real time. Alternatively, the communication module 1230 can receive application-related data substantially long after the mobile electronic device accesses and stores the application-related data locally. However, the communication module 1230 can access and download user-elected application data and related visual content via any other communication protocol, through any other secondary or mobile electronic device, or in any other way.

The communication module 1230 is preferably configured to receive data from the remote server, including the user-elected application, application-related data, and additional visual content. However, the communication module 1230 can also transmit data to the remote server, such as vehicle location data, visual content exposure (e.g., how long visual content is rendered on the display 1210, how many individuals read or noticed the visual content), a user preference, vehicle or vehicle occupant identification information, a local person, vehicle, or environmental condition, or any other relevant data or information. Such data is preferably stored on the memory 1220 and transmitted to the remote server when a suitable connection is established (e.g., through a Wi-Fi-enabled mobile electronic device or according to a predefined system update schedule. However, the memory 1220 can store any other data and the communication module 1230 can send and/or receive any other relevant information to and/or from the remote server.

The processor 1240 of the system 1200 is configured to selectively execute applications to control content rendered on the display 1200, including the user-elected application and the vehicle identification application. The processor 1240 is preferably arranged within the housing that also contains the memory 1220 and the display 1200, though the processor 1240 can alternatively be remote from the display 1200, such as arranged adjacent or physically coextensive with an ECM of the vehicle. The processor 1240 is preferably coupled to memory and to the display 1210 via a wired connection, such as a trace on a shared printed circuit board (PCB). However, the processor 1240 can alternatively communicate with the memory 1220 and/or display via a wireless or optical connection. Furthermore, the processor 1240 can be physically coextensive with a processor of a mobile electronic device carried by the user. However, the processor 1240 can be arranged in any other way, and the processor

1240 can communicate with the memory 1220 and/or display in any other way or according to any other protocol.

The processor 1240 preferably handles transitions between applications and controls physical content rendered on the display 1210. By selectively executing applications, the processor 1240 can execute the vehicle identification application exclusively, the user-elected application exclusively, and/or the vehicle identification application and the user-elected application simultaneously. When executing the vehicle identification application, the processor 1240 preferably accesses vehicle identification information stored on the memory 1220 and handles rendering the vehicle identification information on the display 1210. The processor 1240 also preferably accesses necessary application and application-related data from the memory 1220 when executing the user-elected application. The processor 1240 can additionally or alternatively access relevant data directly from the remote server, such as via the communication module 1230, to execute the application and select content to render on the display 1210. The processor 1240 preferably selectively executes the applications based upon the location of the vehicle, the proximity of the vehicle to a known or identified entity, an input from the user, an input from a known or identified entity outside of the vehicle, a user preference, a timer, a quality of a second local vehicle (e.g., child occupancy, a demographic of a driver, a driving record of a driver, the make and model of the second vehicle), or any other suitable trigger or input. A transition between two applications can be native to one or more applications, defined by the processor 1240 outside of an application, set by the remote server, triggered by the user, or triggered by a second user or other entity outside of the vehicle. However, the transition between applications can be generated, defined, or set in any other way or by any other party.

In a variation of the system 1200 in which a transition between applications is triggered by a party external the system 1200 (e.g., the user, a second user, an external entity), the processor 1240 preferably receives the trigger event through the communication module 1230. In one example implementation, the communication module 1230 includes a GNSS/GPS sensor, and the processor 1240 transitions to a toll application when the communicate module estimates that the vehicle is within a specified range of a tollbooth. In another example implementation, the communication module 1230 includes an infrared (IR) sensor, and the processor 1240 transitions to the vehicle identification application when a police officer points an IR remote at the communication module 1230. In yet another example implementation, the communication module 1230 includes an input region (e.g., a physical switch, a touch screen) arranged within the cabin of the vehicle and accessible by the user, and the processor 1240 transitions between applications based upon a user interaction with the input region (e.g., flipping the switch, selecting a touch screen input region). However, the trigger can be any other type of input provided or generated by any suitable user, individual, or entity.

In one variation of the system 1200, the processor 1240 executes the vehicle identification application that prompts the display 1210 to render government-issued vehicle identification information. The display 1210 preferably renders a government-issued license plate number when the processor 1240 executes the vehicle identification application, though the display 1210 can depict additional identification information, such as registration information, the name, permit, or driver's license number of a current occupant or driver, the license-issuing state, or a driving record of the current driver or owner of the vehicle. The license plate number or other identifier of the vehicle is preferably stored on a non-volatile, read-only portion of the memory 1220 such that license plate number or other identifier cannot be changed once programmed onto the system 1200. Alternatively, the license plate number or other identifier can be protected by one or more firewalls, passwords, secure embedded systems (OS kernel, CPU, memory), passwords, cryptography schemes, etc. to substantially prevent illegal tampering with government-issued registration and identification information loaded onto the system 1200 that is mounted or otherwise coupled to the vehicle.

In this variation, the vehicle identification application can be national-, state-, or local government-specific such that various government entities can issue customized vehicle identification applications tailored to the rules, regulations, registration procedures, needs, etc. of each national, state, or local government. In one example, states can set different font sizes or typefaces, define placement of license plate numbers and registration tags, provide special templates or designs, or define any other formatting or stylistic property of visual content rendered on the display 1210 through the vehicle identification application. In another example, state governments can set automatic registration protocols, such as how registration requests are routed to a department of motor vehicles server and how a digital registration "sticker" is transmitted back to the system 1200 as a vehicle identification information update. In a further example, local governments can set how or when vehicle identification information is installed on the system 1200, such as during manufacture or assembly of the system 1200, when the system 1200 is installed on a vehicle following delivery to a dealer, when the vehicle including the system 1200 is first registered at a DMV, when the vehicle including the system 1200 changes hands, and/or when an owner or user requests a license plate template change (e.g., standard to historic vehicle plate) or a change to vehicle registration (e.g., operational to non-op status, passenger to commercial vehicle status). In still another example, state governments can set triggers controlling transitions into the vehicle identification application, such as when the vehicle is within a preset range of an intersection, when the vehicle is within a preset range of a police officer, at specified intervals, when the vehicle is moving above a certain speed, when the vehicle is parked, when the vehicle is in a certain location, or given a trigger from a state-issued remote control device. However, national, state, and/or local governments can set any other relevant parameters of the vehicle identification application and/or the vehicle identification information rendered on the display 1210 when the vehicle identification application executes. These parameters can also be modified or redefined over time, such as with updates for the vehicle identification application distributed to the system 1200 via the remote server.

In one variation of the system 1200, the user-elected application is an advertising application, wherein the display 1210 renders the additional visual content that is an advertisement when the advertising application executes. In this variation, the user can select specific advertisements to render on the display 1210. For example, the user who is a Giants baseball fan can select advertisements for tickets to Giants baseball games. In another example, the user that is a car dealership can select vehicle discounts and other dealership advertisements to be rendered on the display 1210 when the vehicle is parked in a dealer lot. Additionally or alternatively, the user can elect certain advertising preferences or provide personal or demographic information that control which advertisements are rendered on the display 1210. In one example, for the user who is a vegan, advertisements for fast food meat products are excluded from the advertising application executing on the system 1200 mounted to the vehicle owner by the user. In another example, whitewater rafting trips are rendered on the display 1210 for the user who enjoys outdoor activities. In yet another example, for the user who is a country music fan, a playlist for a local country music radio station is rendered on the display 1210. In this variation of the system 1200, the additional visual content is preferably targeted at a second user, individual, etc. outside of the vehicle. The second user, individual, etc. outside of the vehicle is also preferably within a field of view of the display 1210 such that the advertisement is legible for the second user, individual, etc.

In this variation, the processor 1240 can track advertisement exposure such that the user can be compensated for advertising products, goods, or services on the vehicle. In one example, the processor 1240 tracks the amount of time an advertisement is displayed. In another example, the processor 1240 is coupled to a camera and implements machine vision to identify and count the number of individuals who looked at display while the advertisement is rendered. In a further example, the system 1200 implements global positioning to track the number of vehicles within a field of view of the display 1210 while the advertisement is rendered. In this variation, the display 1210 time or amount of exposure of the advertisement is preferably used to calculate the amount of user compensation for the advertisement. Distribution of funds, prizes, discounts, coupons, or other forms of compensation are preferably handled by the remote server that accesses an account of the user, fleet manager, vehicle owner, etc. to deposit the compensation to the user or other suitable entity.

In another variation of the system 1200, the user-elected application is a road alert application, wherein the display 1210 renders a road alert when the road alert application executes. In this variation, the display 1210 preferably renders content substantially relevant to a second user outside of the vehicle, such as a second user who is following the vehicle in a second vehicle. The road alert application preferably informs the second user of upcoming road hazards, such as traffic conditions, accidents, potholes, construction, narrowed lanes, changes to a carpool lane or carpool lane restriction, onramps, or debris. Notification of tailgating, erratic driving, or dangerous behavior can also be provided to following vehicles. In one example implementation, the user elects the road alert application in order to inform trailing vehicles of upcoming traffic or road conditions, which can improve driving safety of the user by improving current traffic-related knowledge of other drivers around the user. In another example implementation, the second user, who is following the vehicle in a second vehicle, requests installation of the road alert application on the system 1200 coupled to the vehicle. In this example implementation, the remote server preferably identifies the second user and/or the second vehicle that is/are proximal the user and/or the vehicle, such as through GNSS/GPS tracking or short-range communications. The remote server then preferably checks the application request against preferences of the user and uploads the road alert application to the system 1200 when appropriate. Similarly, in an example implementation in which the road alert application is already installed on the system 1200, the second user can supply an input (e.g., via a smartphone) to trigger a transition into the road alert application or to select particular road-related information to render on the display 1210, such as 'traffic conditions for the next five miles.' Therefore, individuals or entities outside of the vehicle can substantially control an application installed on the system 1200, a transition between two applications, and/or a selection of additional visual content rendered on the display 1210 when the processor 1240 executes the application.

In another variation of the system 1200, the user-elected application is a driving direction application, wherein the display 1210 renders a driving direction when the driving direction application executes. The driving direction application is preferably similar to the road alert application described above, wherein the system 1200 displays information relevant to an individual outside of the vehicle. In this variation, the display 1210 preferably depicts a driving direction for a second user driving behind the vehicle and within a field of view of the display 1210 such that the second user does not need to remove his eyes from the road to view a driving direction. As described above, installation of the driving direction can be initiated by the user or requested by the second user. The second user also preferably requests directions to a destination, wherein the directions are handled by a remote server and pushed to the system 1200 for presentation to the second user. The system 1200 and/or the remote server can also identify additional vehicles proximal the second user and distribute driving directions across multiple vehicles followed by the second user over the course of the trip. However, the system 1200 can implement the user-elected application that is a driving direction application in any other suitable way.

In another variation of the system 1200, the user-elected application is a news application, wherein the display 1210 renders a news alert when the news application executes. In this variation, the display 1210 preferably renders local, state, national, or international current events, such as national political headlines or international economic headlines. Additionally or alternatively, the display 1210 can render personal news or events related to the user or other individuals proximal the user, such as a news feeds, status update, message, or post sourced from a social network, blog, or other online service or network. For example, the display 1210 can render a user status update that is "So excited—I just bought tickets for the Giants game tomorrow night," or "my friend Sammie just posted a new chili recipe to her cooking blog." In this variation, the display 1210 can also render a visual pointer linking to the source of news content. For example, the display 1210 can render a two-dimensional bar code, wherein an individual outside of the vehicle can user a smartphone implementing a camera to read the bar code and automatically access a news article, social network, blog, etc. from which the news content was sourced. Similarly, the communication module 1230 can (wirelessly) output the pointer that is then accessed by a mobile electronic device carried by an individual outside of the vehicle to open the source of the news content.

In another variation of the system 1200, the user-elected application is an interstate trucking application, wherein the display 1210 exhibits the status of trucking certifications for the vehicle that is a commercial truck traveling across a state border. In this variation, the system 1200 preferably interfaces with a local or global positioning system to track the location of the vehicle, such as when the vehicle crosses a state border and/or which roads the vehicle has covered. From this vehicle location information, the system 1200 and the remote server preferably cooperate to pay required fees and taxes, submit required vehicle information (e.g., vehicle gross weight) to relevant authorities (e.g., a department of motor vehicles), and to render visually on the display 1210 the current status of vehicle certifications and payments. For example, an RFID tag included in the communication module 1230 can trigger an RFID reader proximal a highway near a state border, wherein the trigger informs the remote server that the vehicle has crossed a state border, and wherein the remote server subsequently pushes relevant vehicle and payment information to an appropriate authority and the display 1210 renders visual indicators of the certifications and payment. In this variation, the trucking application is preferably installed on the system 1200 by the user who is a fleet manager for a vehicle fleet including the vehicle such that the fleet manager can use the trucking application executing on a plurality of vehicles in the vehicle fleet to track and manage interstate trucking fees, payments, and certifications. However, in this variation, the trucking application can handle trucking certifications to the exclusion of application-specific or application-relevant visual content, wherein the system 1200 does not update visual content rendered on the display 1210 when the processor 1240 executes the trucking application. However, the system 1200 can function in any other way when executing the user-elected application that is a trucking application.

In another variation of the system 1200, the user-elected application is a messaging application, wherein the display 1210 renders a personal message when the messaging application executes. In this variation, the user preferably generates the personal message, and the message is preferably text-based, though the message can additionally or alternatively include a static image or video. The user can generate the message on a message generation website accessible on a computer and supported by the remote server, through a message generation application executing on a mobile electronic device carried by the user and supported by the remote server, through an onboard vehicle voice control system coupled to the system 1200, or through any other suitable means. For example, the user can generate the message that is "Happy 17th Birthday, Tom," "Go Giants," or "Acme Moving Services—call 800.555.9876." Alternatively, the user can select the message from a predefined set of messages or download the message from a website, online user profile, social network, etc. For example, the user can download a "How's my driving? sign," a "Baby on Board" sign, a digital bumper sticker, or a background image for the display 1210. Similarly, the user can pull the message from a social network post, comment, or message. However, the user can generate or select any other message including any other content for rendering on the display 1210.

In another variation of the system 1200, the user-elected application is a tollway application, wherein the system 1200 handles toll payments for the vehicle passing through a tollbooth or toll plaza. Like the interstate trucking application described above, the system 1200 executing the tollway application preferably monitors the location of the vehicle and/or communicates with a tollbooth or tollway to trigger a toll payment. The system 1200 and/or remote server preferably interface(s) with the tollbooth or a toll management server to pay for the vehicle toll, and once the toll has been paid, the display 1210 preferably renders visual content that indicates that the toll is paid. However, the tollway application can handle toll payments to the exclusion of visual content, wherein the system 1200 does not change or update visual content rendered on the display 1210 when the tollway application executes. However, the tollway application can function in any other way.

In another variation of the system 1200, the user-elected application is a gaming application, wherein the display 1210 renders gaming content when the gaming application executes. In this variation, the system 1200 preferably enables gaming between the user and any other individual proximal the user. For example, the user in the vehicle can play a game with a second user in a second vehicle when the second vehicle is following the first vehicle, the user is facing a system 1200 installed on the front of the second vehicle, and the second user is facing the system 1200 installed on the back of the vehicle. In this example, the user can control the output of a second display on the second vehicle via a handheld electronic device, and the second user can control the output of the display 1210 on the vehicle through a second handheld electronic device. Therefore, the system 1200, installed on a plurality of vehicles, can enable a gaming platform or gaming interface for users occupying different but nearby vehicles.

The applications configured to execute on the system 1200 are preferably created by third-party developers and hosted on the remote server such that the user can preview applications, select relevant applications, and install the relevant applications on the system 1200 for subsequent use. The remote server preferably provides a software development kit (SDK) and/or hosts an application programming interface (API) to support application creation and development by the third-party developers. The third-party developers can represent government agencies (e.g., a state DMV), private institutions (e.g., a private toll plaza on a private highway, a retailer), or independent users. However, the system 1200 and/or remote server can function in any other way to support development of applications that enable additional functionalities for the system 1200.

Figure 13:
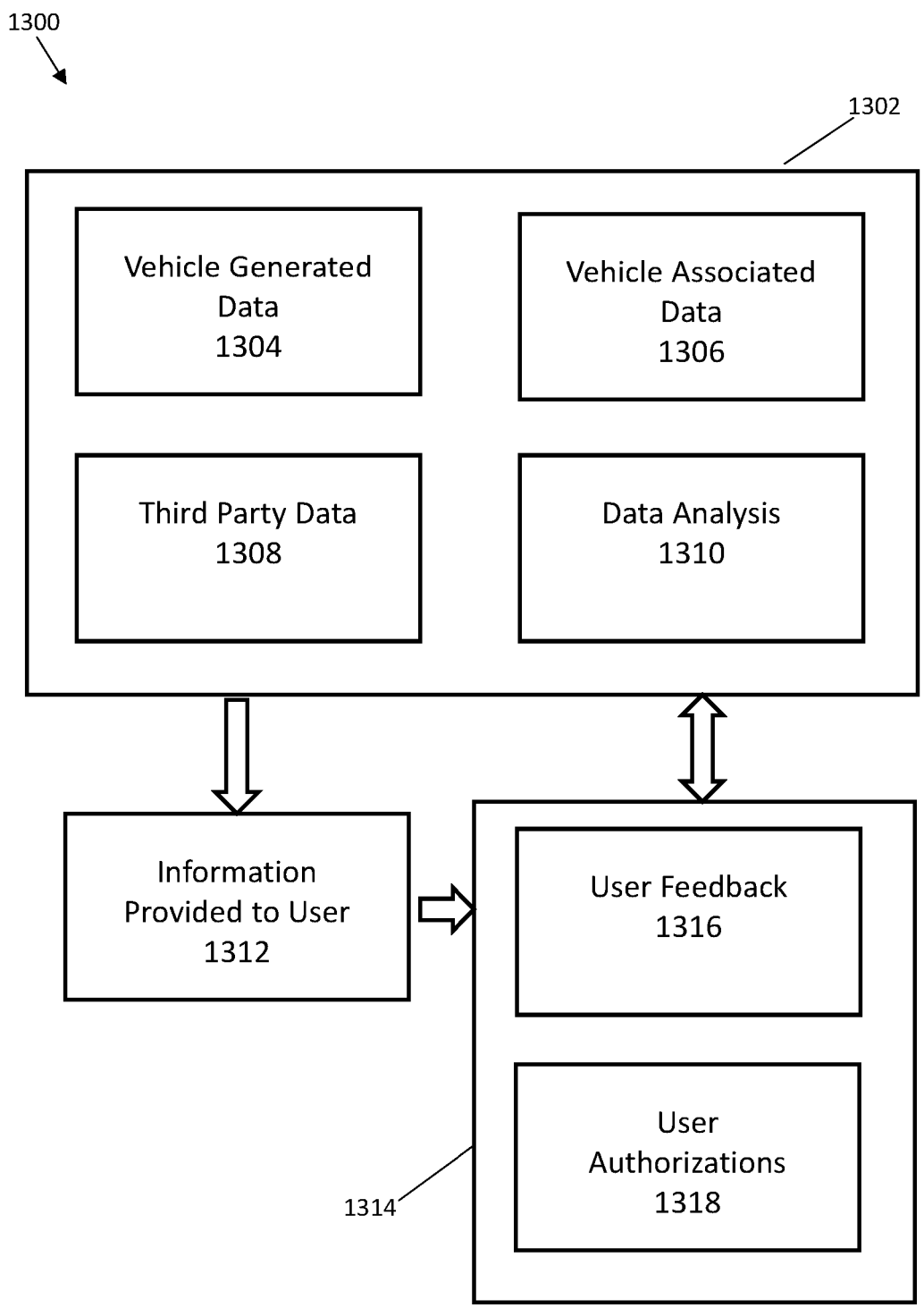
FIG. 13 illustrates various available types of data for the digital license plate system.

FIG. 13 schematically illustrates a data system 1300 including various types or categories of data that is storable, analyzable, transmittable, or receivable by a digital license plate 1302. Data can include vehicle generated data 1304 that can be stored, directly sensed, derived, or calculated from vehicle sensors or data sources, and can further include sensors provided in the digital license plate 1302 and any supporting electronics such as described in the disclosed embodiments. Other data categories can include vehicle associated data 1306 (e.g. license information, registration, expiration date, insurance status, vehicle manuals, vehicle guides, or how-to information), third party data 1308 (e.g. advertiser information, road tour guides, games, entertainment), or simulation or analysis data created by a data analysis module 1310 (e.g. calculated tire or engine wear).

Data from digital license plate 1302 can be provided to a user as information 1312, typically via a smartphone application, text or email messages, vehicle dashboard screen, other, in-vehicle user interfaces, or web based interfaces (both in-vehicle or through a user's personal computer or laptop). Visual displays, printed information, audio, or any suitable user interface can be used to provide the information. Information can be provided in response to a query, as a warning announcement, or as a regular report. Information can be prioritized according to time or importance, with learning algorithms able to adjust a presentation to provide information in a form best suited for a user. For example, over time, items commonly requested by a user, or key performance indicators/warnings can be presented on a main screen rather than requiring menu selection or navigation to sub-screens.

User data 1314 can include personal data, as well as user feedback 1316 in response to information 1312, or various commands, instructions, or authorizations 1318 to allow access to or release of data from the digital license plate 1302. Preset security levels can be set and authorized by a user, with modifications or changes being allowed. For example, a user might wish to invoke a privacy mode that prevents storage or release of vehicle location history or vehicle speed. In another example, data relevant to advertisers can be authorized for release in return for access to a third party web site, use of a smartphone application, or payment.

Vehicle generated data 1304 can include but is not limited to that related to health of vehicle, display time and location of third party advertising images, gas mileage, road conditions (e.g. rough vs. smooth as detected by accelerometers), pothole identification, weather conditions, temperature, humidity, number of people riding in vehicle, amount of weight placed in the vehicle, braking habits, acceleration/deceleration habits, and location and timing information to support usage based insurance. Other data useful for monitoring a digital license plate can include digital license plate operational status, digital license plate battery status, camera readiness, memory usage, external battery (i.e. vehicle battery) charge availability, voltage levels, and self-test/monitoring results.

Other vehicle generated data can include information related to maintenance, including predictive maintenance based on data analysis 1310 (e.g. "Please take me in for service soon, transmission is predicted to fail within the next month."). Expected maintenance costs can be provided, as well as information relating to maintenance history, and repaired or replaced parts.

Vehicle generated data can be combined with third party data 1308, including that from vehicle conveyed electronic devices (e.g. personal smartphones or cameras), or third party insurance or vehicle databases to provide a wide range of information. This can include vehicle cost of ownership, readiness to purchase next vehicle: number of days since last purchase, mileage, gas usage and payment verification, cost comparison with last vehicle, cost comparison with a comparable third party vehicle, or cost comparison with a similar fleet vehicle. Financial information related to the vehicle such as percentage paid off on vehicle, days until paid off, or verification of insurance payments can also be provided.

Information (data with context) is presented to the customer, allowing them to generate their own insights. For example, weekend vehicle usage and costs can be compared and separated from weekday business usage, allowing a user to determine cost of recreational use of a vehicle or help reduce overall vehicle costs. Suggestions or recommendations can be made, for example, when and where to refill fuel (e.g. best results being on the weekend, at a low-cost gasoline station located in a direction opposite to a user's workplace, but near a restaurant well-liked by the user). Such information and "insights" (i.e. data based suggestions or recommendations) can be communicated simultaneously to the user, who can be further prompted for actions such as reminders to visit the restaurant and fill up with fuel on the trip home.

Alternatively, list of insights requiring action can be presented to the customer. Continuing the foregoing example, a prioritized list of nearby gasoline stations can be provided, along with recommended times to refill. For example, the digital license plate 1302 can integrate data 1304 (historical gas mileage), data 1306 (recommended grade of vehicle gas), data 1308 (location and reviews of gas stations), data 1310 (calculated or simulated vehicle location) and user data 1314 (user calendar provides available time and likelihood of visiting the restaurant based on recorded user habits) to provide a list of recommendations and resulting cost savings.

In another described embodiment, a digital license plate can directly or indirectly communicate with local entities capable of providing goods or services. For example, in one embodiment, a Bluetooth communication system on-board or connected to a digital license can communicate with a Bluetooth compatible beacon or communication system at a services station. As an example, fuel can be ordered and paid for, goods such as food and drink can be purchased, and local information requested by a digital license plate interacting with a service station. In operation, once a vehicle with a digital license plate stops moving (e.g. after maneuvering to stop in front of the gas pump), it can activate and attempt to read nearby Bluetooth packets and associated signal strength. Signal strengths and Bluetooth packet are recorded and sent to a software purchase system. The software purchase system will identify the user, gas station and pump number. If signal strength is strong enough to determine a pump with a defined accuracy, a message will appear on the plate saying "Authorized! Please begin fueling from pump X." If the platform is unable to identify the pump the phone/plate will display "Please Move Vehicle Closer To Pump". After conclusion of refueling, the pump indicates completion of transaction and provides a digital receipt (or paper receipt at the pump, if requested). In effect, digital license plate mediated payment for fuel is possible using only information relevant to a gas station as determined using on board GNSS/GPS from the digital license plate; customer information as provided by the digital license plate database during setup; and fuel pump number, as determined using a set of pump associated beacons that transmit information to the digital license plate.

Figure 14:
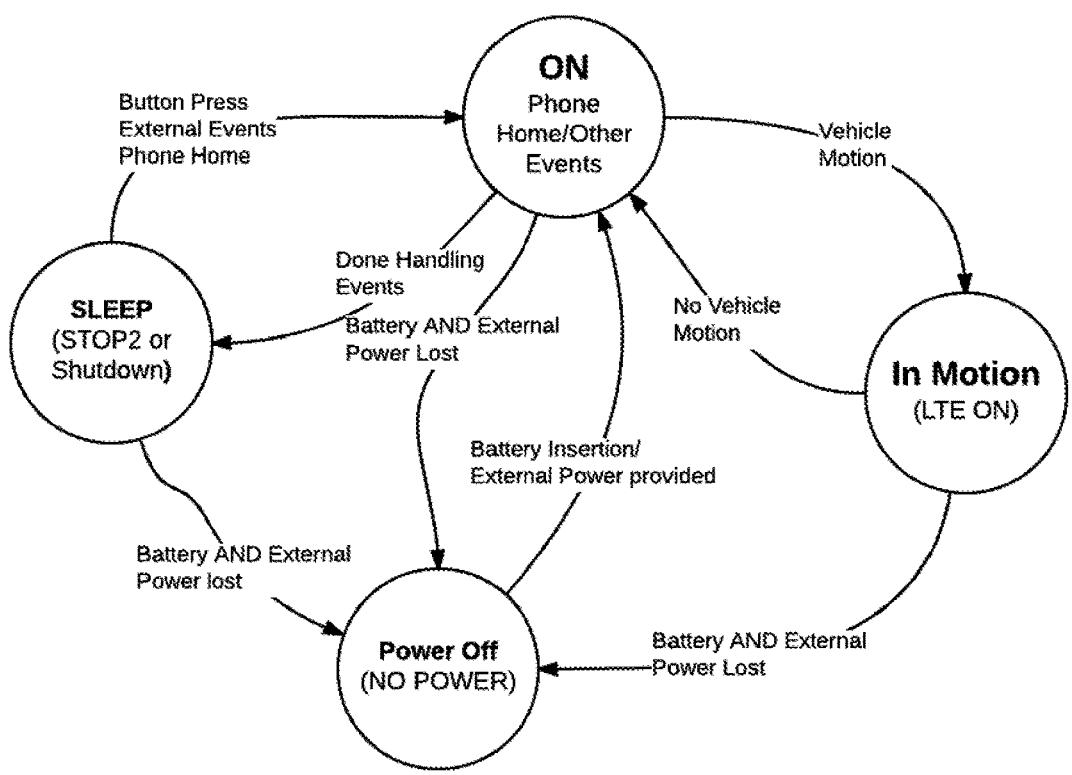
FIG. 14 illustrates a state diagram for a digital license plate with normally available external power.

FIG. 14 illustrates a state diagram 1400 for a digital license plate with normally available external power. Various modes are defined, including 1) a Power OFF mode having no internal battery, low internal battery, no external power, or low external power; 2) a low power Sleep mode that the digital license plate reverts to after the car has been "parked" for a defined amount of time, only waking as needed for temperature related reasons or Phone Home Timeout situations; 3) an ON mode with the processor fully ON and intermittently polling sensors to validate vehicle motion (after a defined duration without activity/vibration, the plate reverts to SLEEP mode); and 4) an In Motion mode for when the car is in motion, LTE is ON and communicating to external server(s) to provide GPS location, health status, and other information, while also receiving useful data.

In operation, Power OFF mode ends when any suitable power source (typically internal or vehicle electrical system is attached. This begins processor initialization and boot up, followed by an attempt to phone home. If the vehicle is not in motion, the Sleep mode can be triggered.

Sleep mode is a low power mode in which regular sensor polling or clock timing can trigger a wake to ON state. Triggers can include high or low temperature, plate attach or removal, Phone Home triggers, vibration detection, or user initiated Button press.

On state is used to handle events, including sensor (e.g. accelerometer) polling. After events are handled, the plate typically moves to either a sleep state or the In Motion state.

During an In Motion state, a Phone Home action is initiated. Depending upon configuration, the digital license plate can intermittently or continuously remain in connection with external server/data sources via LTE or other wireless connection. If the vehicle stops, after a predetermined time interval the digital license plate can go into a sleep mode.

Figure 15:
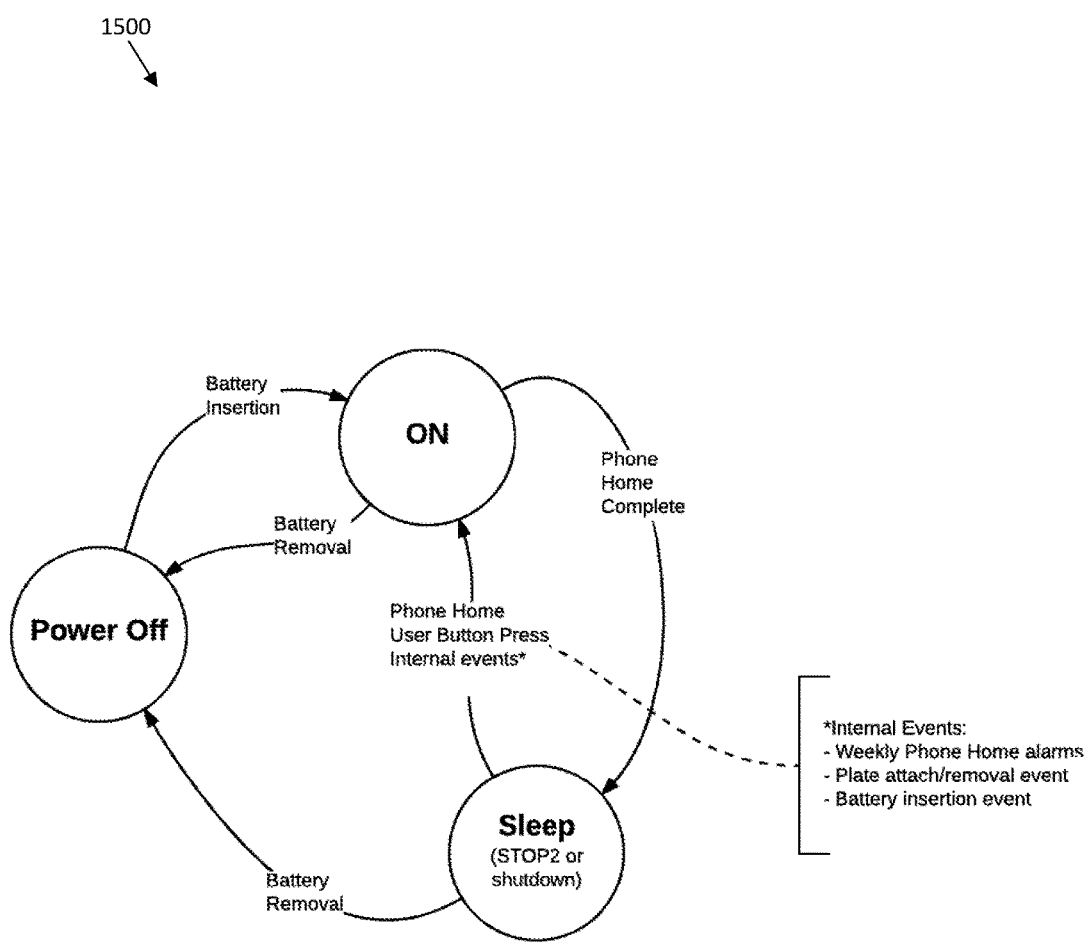
FIG. 15 illustrates a state diagram for a digital license plate with normally available external power.

FIG. 15 illustrates a state diagram 1500 for a digital license plate without normally available external power. Without vehicle power, the digital license plate is limited in actions because of the need to conserve power. Typically, the digital license plate will only Phone Home once a week to get updates and change messages, and will normally be in a sleep mode.

Figure 16:
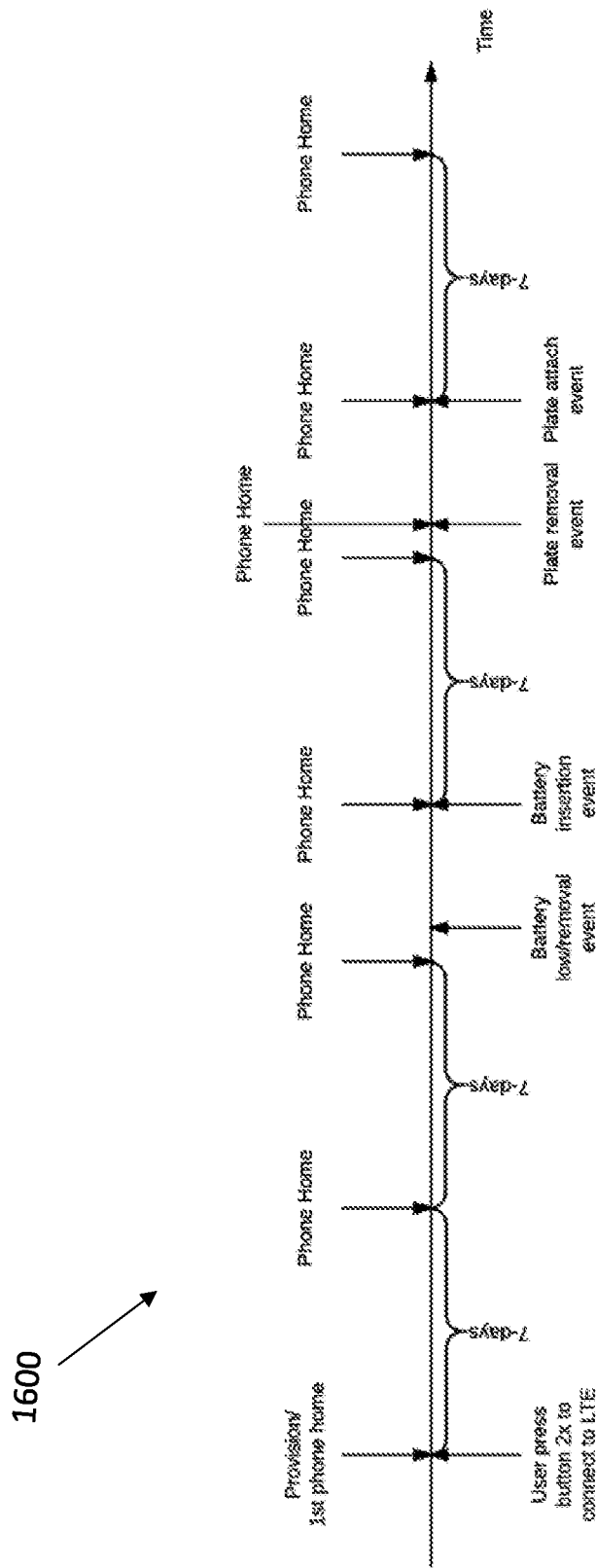
FIG. 16 illustrates an event timeline for a digital license plate.

FIG. 16 illustrates an event timeline 1600 for a digital license plate that operates without vehicle power. Events such as weekly alarms, battery insertion/removal, or plate attachment/removal will trigger mode changes requiring a Phone Home. Phone Home action is can be used for initial software provisioning or software updates.

Figure 17:
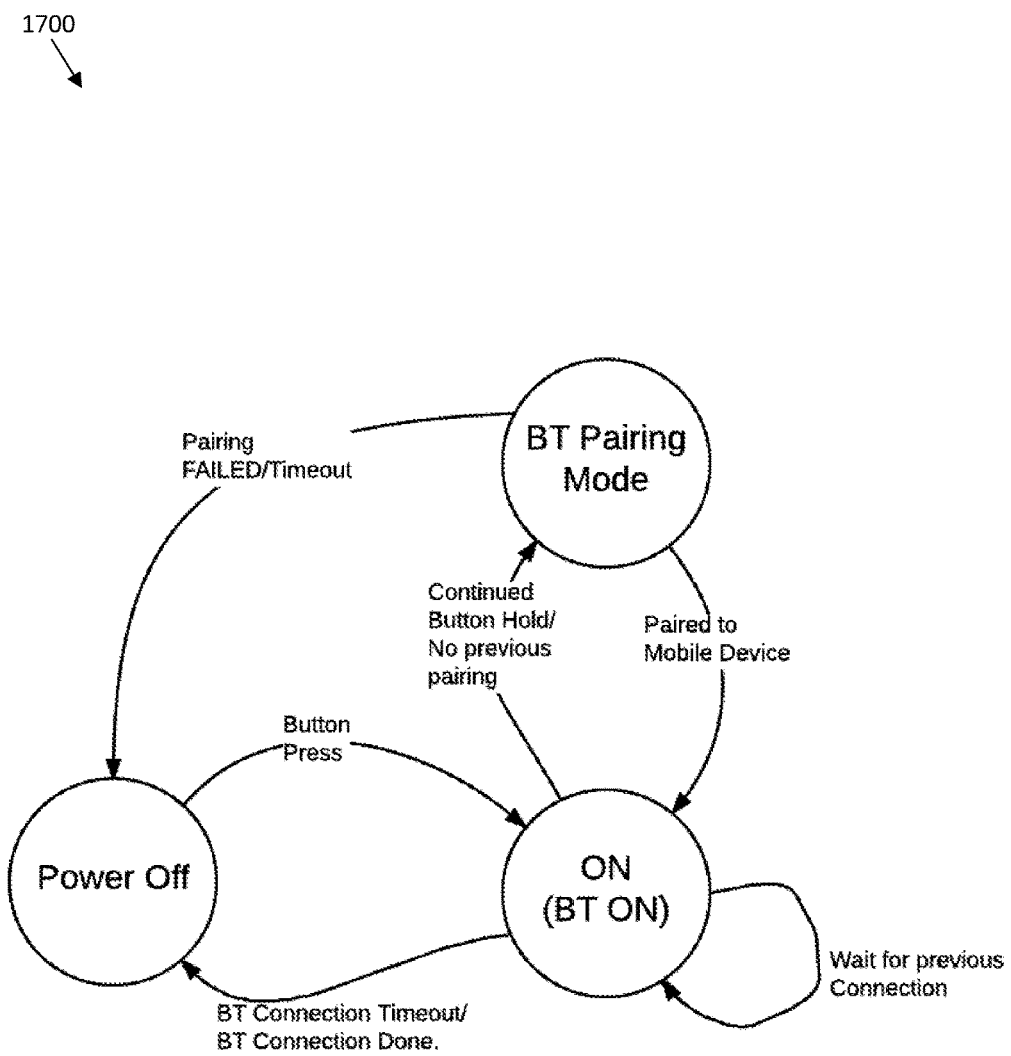
FIG. 17 illustrates local software provisioning of a digital license plate.

FIG. 17 illustrates local software provisioning 1700 of a digital license plate. While the Phone Home action can be used for provisioning and updates, auto dealers or authorized users to may want to locally provision the digital license plate before the digital license plate is connected to a particular vehicle and/or user. In operation, such provisioning relies on Bluetooth (BT) pairing and transfer of firmware or other data.

Figure 18A:
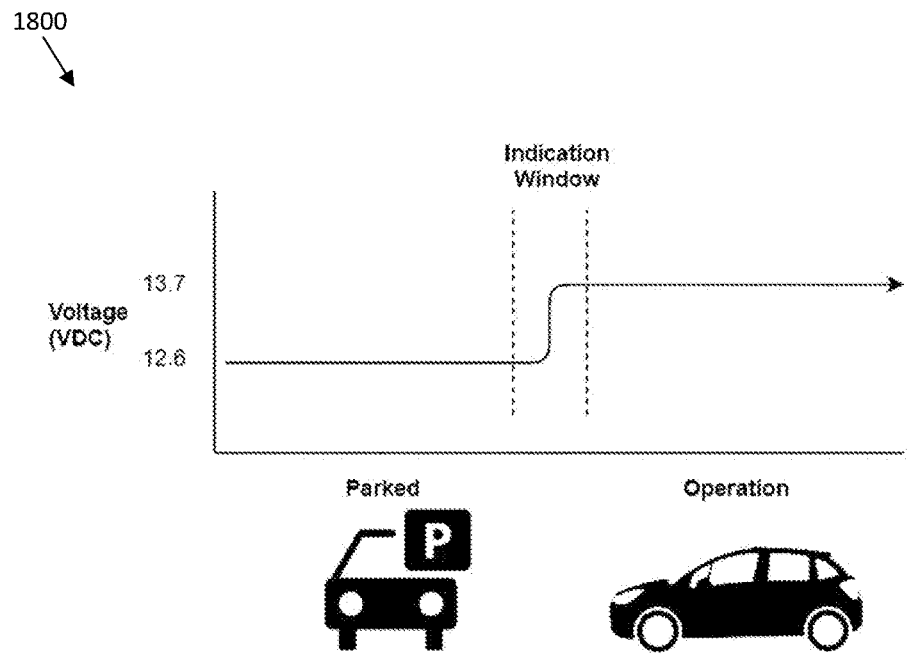
FIGS. 18A and 18B illustrates detection of vehicle status changes using voltage changes.
Figure 18B:
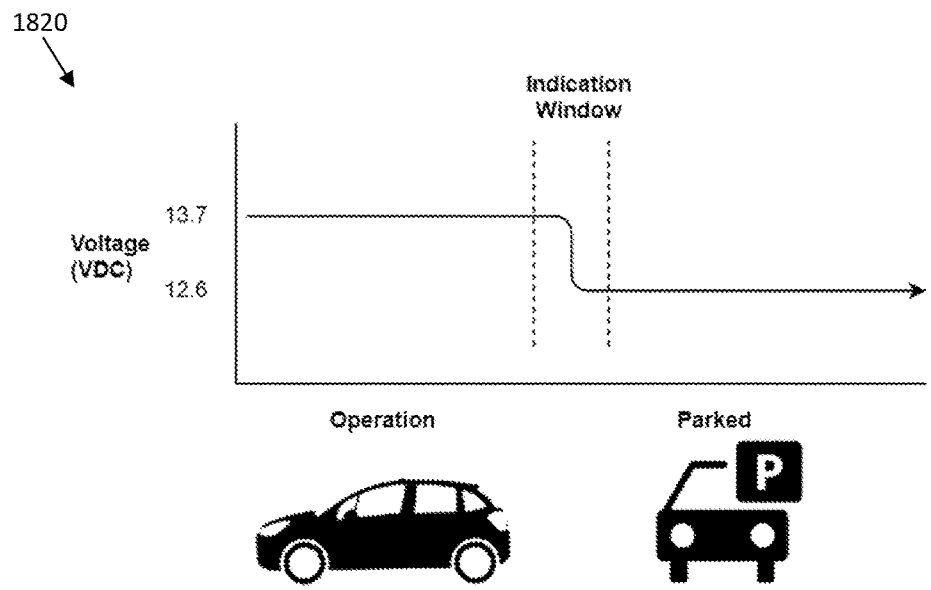

FIGS. 18A and 18B are graphs 1800 and 1820 respectively illustrating detection of vehicle status changes using voltage changes. In one embodiment, a digital license plate is equipped with an Analog to digital converter (ADC), Accelerometer/Gyroscope, GNSS/GPS receiver, LTE radio, and a Real-Time Clock (RTC). These components can be used to determine if a vehicle is in operation (running), a vehicle is parked (not-running), and whether the vehicle is in motion. For example, in graph 1800, voltage as measured and converted by the ADC to digital form can be used by the digital license plate to determine when a vehicle has shifted from a Parked mode with a normal 12.6-volt state, to an Operation mode with a normal 13.7-volt state. Similarly, in graph 1820, the drop-in voltage can be used to determine when the vehicle has shifted from an Operation mode to a Parked mode.

Figure 19A:
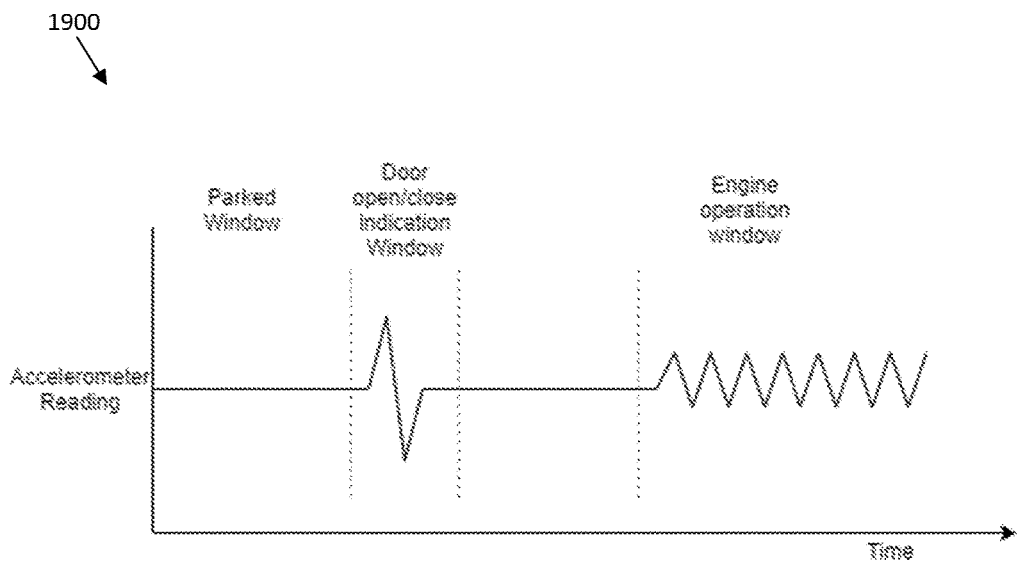
FIGS. 19A and 19B illustrates detection of vehicle status changes using accelerometer information.
Figure 19B:
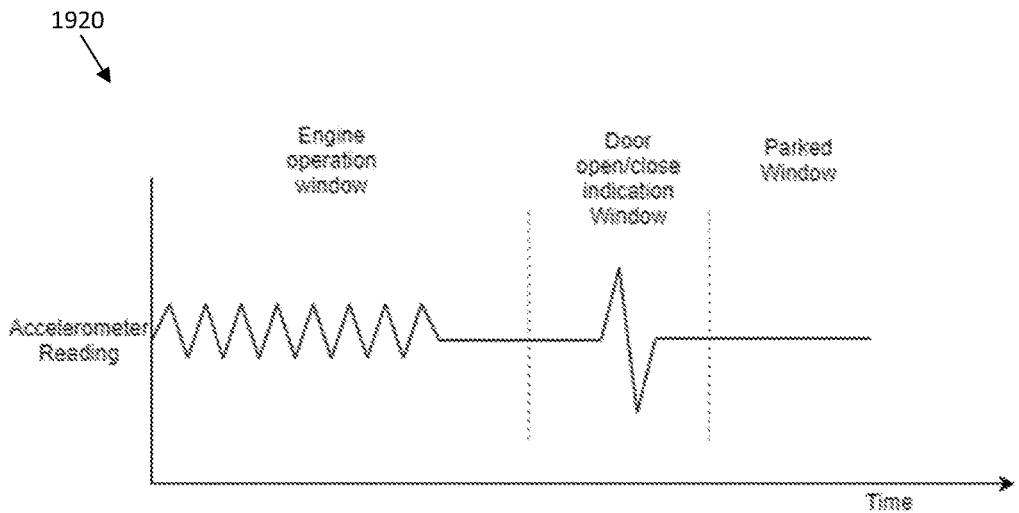

FIGS. 19A and 19B are graphs 1900 and 1920 respectively illustrating detection of vehicle status changes using accelerometer information. For example, an accelerometer reading can distinguish a large impulse acceleration reading from opening or closing a door, from a regular, periodic acceleration due to engine operation.

Figure 20:
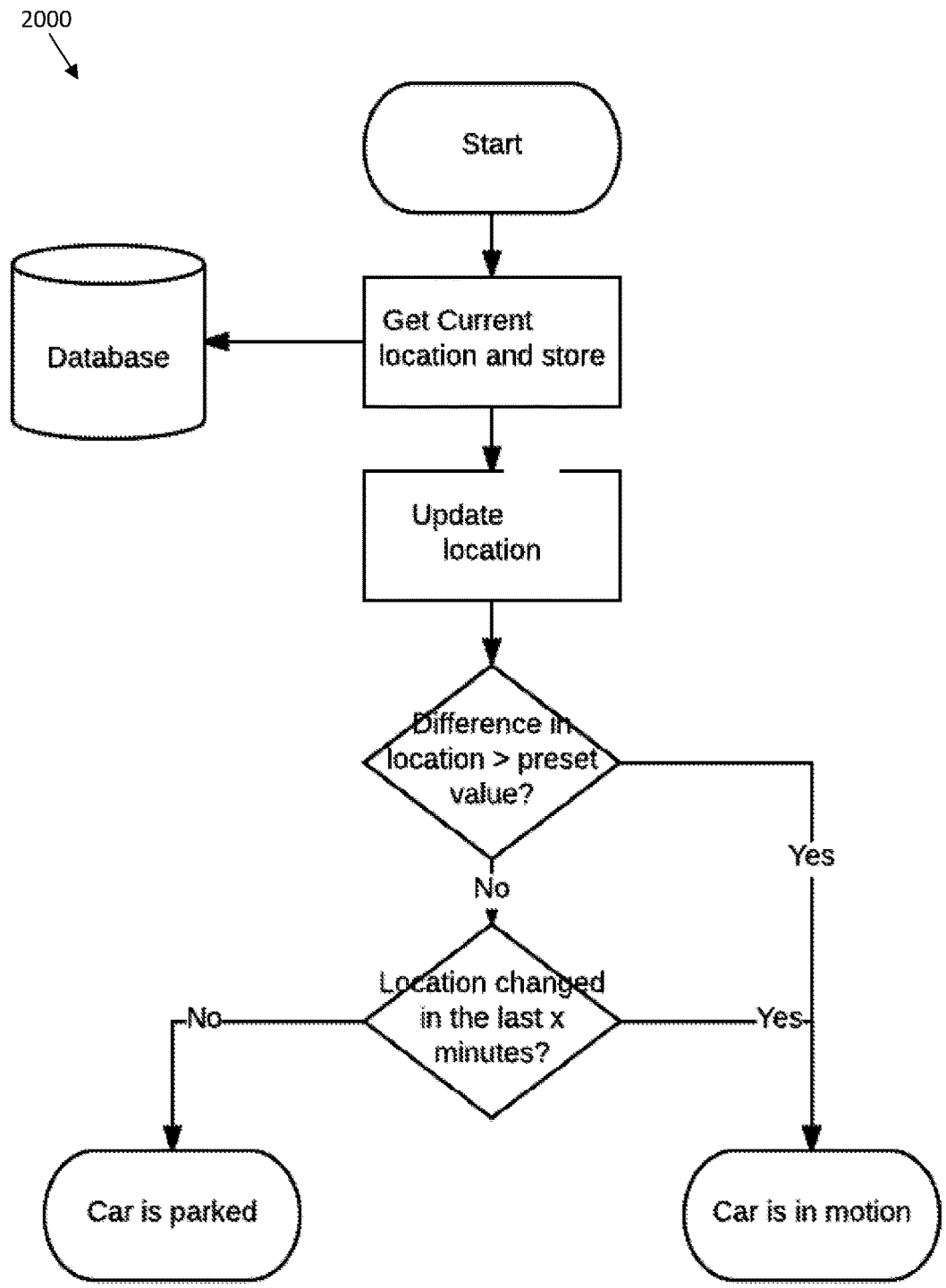
FIG. 20 illustrates determining vehicle location state.

FIG. 20 is a flow chart 2000 illustrating determining vehicle location state using GNSS/GPS or LTE location services. As shown, upon moving into an ON mode a digital license plate can get its current location from a local stored database. Then, using on board GNSS/GPS or wirelessly connected LTE location services, the location can be updated. If there is a sufficient preset difference (typically on the order of meters), the vehicle can be indicated as in motion, and the mode of the digital license plate switched to an In Motion mode. Alternatively, if the location difference was not greater than the preset value, and the location has not changed for a set time x, then the digital license plate can determine that the car is parked, and the digital license plate switched to a Sleep mode.

Figure 21:
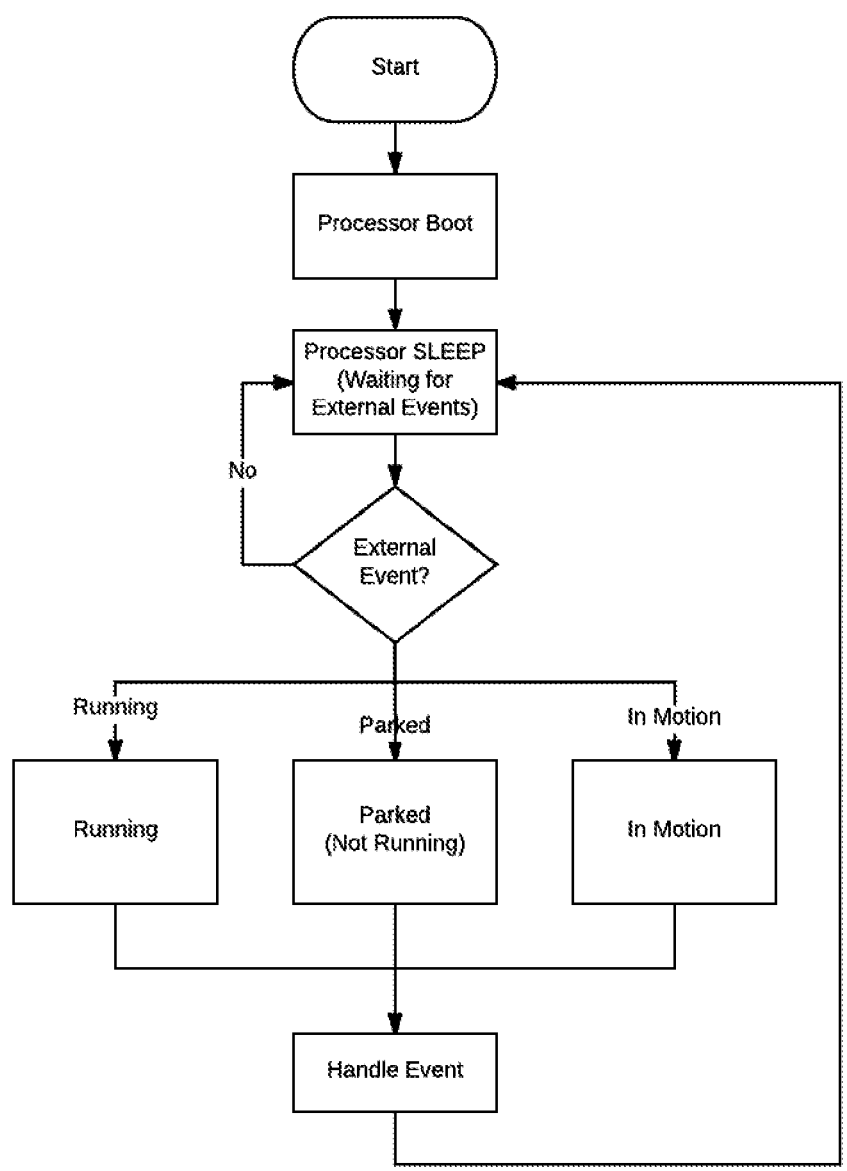
FIG. 21 illustrates a digital license plate operation flowchart.

FIG. 21 illustrates a digital license plate operation flowchart 2100. After start and processor boot up of a digital license plate, the processor (and digital license plate) remains in a sleep mode until an external event occurs. A determination made as to whether a vehicle is running, parked (not running), or in motion. The event is handled, and if necessary, one or more suitable mode changes in digital license plate power and communication status are made. In some embodiments, this mode change determination can utilize external information sources such as personal smartphones. For example, a digital license plate can connected to cloud platform using BTLE running on mobile phone. When a person holding a smartphone approaches the digital license plate, it can look for one or more mobile phone with which it is already paired. If one of those mobile phones connects to the DLP, then a prediction is made that the digital license plate is either in drive mode or is about to go to drive mode. Based on this prediction certain mode changes can be made or functionality of the plate can be enabled or disabled.

Figure 22:
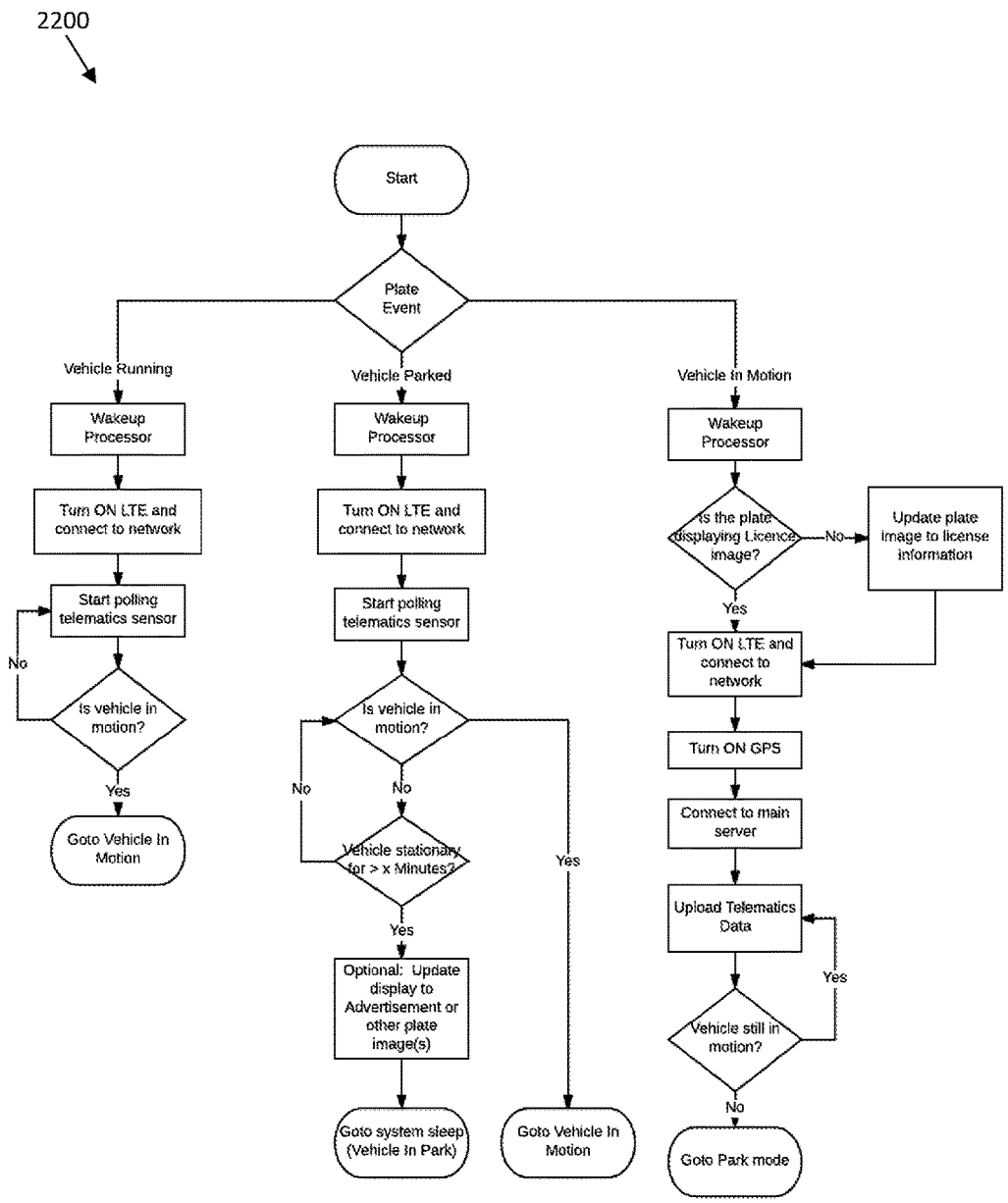
FIG. 22 illustrates a digital license plate wireless connectivity flowchart.

FIG. 22 illustrates a digital license plate long distance wireless connectivity flowchart 2200. When a digital license plate event occurs, three major lines of events can occur based on whether the vehicle is running, the vehicle is parked, or the vehicle is in motion. When the vehicle is running, the processor is woken, LTE is connected, and sensors are polled to determine if the vehicle is in motion. If it is, then mode changes suitable for the vehicle in motion are begun. This includes processor wake up, tests to ensure proper license plate image display (or updates to plate image), LTE connection, GNSS/GPS enablement, and connection to external server/cloud for data receipt. Local sensor (i.e. telematic) data can be uploaded to the server/cloud via LTE, and this repeated at regular intervals until the vehicle stops and the digital license plate switches to a parked mode. When vehicle is parked, the processor can be initially maintained in a wake state, LTE connected, and sensor data collected. If the vehicle remains stationary for a predetermined time, the plate image can be optionally updated or changed, and the digital license plate switched to a sleep mode. Otherwise, the vehicle can be switched back to a vehicle in motion mode if necessary.

As will be understood, determining vehicle state and corresponding digital license plate power and communication state can use multiple combinations of the previously described methods discussed with respect to FIGS. 18A and B, FIGS. 19A and B, FIG. 20, FIG. 21 and FIG. 22. Various statistical, predictive, machine learning, or other techniques for combining and weighting sensor input and external received data, combined or alone, can be used by the digital license plate to determine needed operational mode in response to sensor input or external communication.

Figure 23:
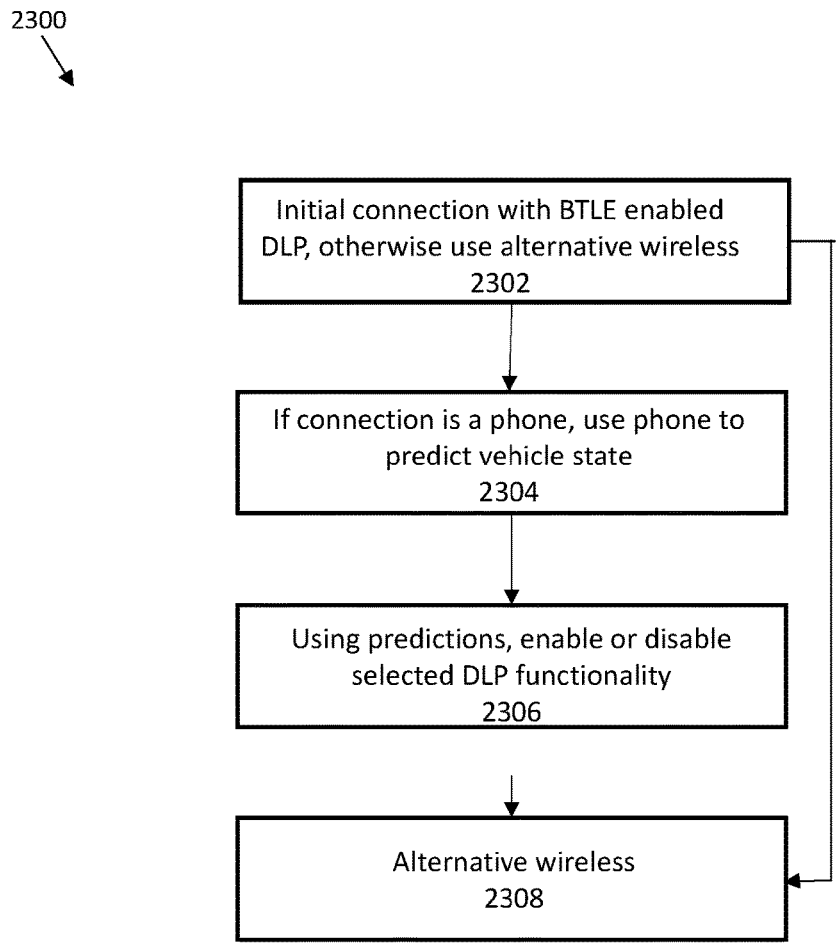
FIG. 23 illustrates a method for low power communication

FIG. 23 illustrates a method of operation of a digital license plate having improved power usage efficiency that can provide better long-term support for power using functions including plate image update, registration, renewal, software update, Amber alerts, or notifications via mobile phone. In one embodiment, a digital license plate is equipped with Bluetooth Low Energy (BTLE) wireless personal area network technology. BTLE technology operates in the spectrum range 2.400-2.4835 GHz ISM band, and has 40 2-MHz channels. Within a channel, data is transmitted using Gaussian frequency shift modulation at a typical bit rate of 1 Mbit/s, and the maximum transmit power is 10 mW. Narrowband interference problems are reduced various frequency hopping or direct-sequence spread spectrum. Additionally, power profiles can be optimized for a digital license plate and various digital license plate applications using Generic Attribute Profile (GATT). GATT operations can include discovery of identifiers (UUIDs) for all primary services, including finding a service with a given UUID, finding secondary services for a given primary service, discovering all characteristics for a given service, finding characteristics matching a given UUID, and reading all descriptors for a particular characteristic.

Commands can be provided to read (data transfer from server to client) and write (from client to server) the values of characteristics. A value may be read either by specifying the characteristic's UUID, or by a handle value (which is returned by the information discovery commands above). Write operations can identify the characteristic by handle. Notification and indications. The client may request a notification for a particular characteristic from the server. The server can then send the value to the client whenever it becomes available. For example, an acceleration sensor server may notify its client every time it takes a measurement. This avoids the need for the client to poll the server, which would require the server's radio circuitry to be constantly operational. Further details are given in Volume 6 Part A (Physical Layer Specification) of the Bluetooth Core Specification V4.0.

Using GATT defined profiles in conjunction with a suitable application programming interface can result in very low power usage as compared to traditional Bluetooth systems. As seen in FIG. 23, a BTLE enabled digital license plate can greatly reduce power consumption and maximize battery life using the following steps 2300. In step 2302, a first connection is attempted and made via BTLE. If a connection is not made after several attempts, alternative (and higher power usage) wireless technologies are the attempted in step 2308. These alternative wireless connections can be via routers or wireless hotspots at home, at work, in-vehicle, or through commercial or public WiFi systems. If WiFi is not available, very high-power usage LTE connections can be attempted. Typically, BTLE connection attempts are most frequently made, followed by WiFi, and infrequently LTE. In some embodiments, a smartphone or other user interface device can be set to provide notifications if wireless connections have not occurred within designated time intervals or during selected events (e,g, using a vehicle) to enable troubleshooting.

In one embodiment using the methods discussed with respect to FIG. 23, a digital license plate can connected to cloud platform using BTLE running on mobile phone. As previously noted, in step 2302 the digital license plate will look for one or more mobile phone with which it is already paired. If one of those mobile phones connects to the DLP, then a prediction is made that the DLP plate is either in drive mode or is about to go to drive mode. Based on this prediction certain functionality of the plate can be enabled or disabled. For example, a targeted message can be retrieved by the mobile phone for transmission to and display on the DLP. In effect, the available electrical power and processing power of the mobile phone is used in conjunction with a low power BTLE connection to control a DLP, instead of high power usage by the on-board WiFi or LTE systems of the DLP. This is of particular use for DLP systems not connected, or only intermittently connected, to vehicle power systems.

In addition to power reduction improvements for the DLP, the described embodiments can improve information transfer and responsiveness, as well as providing additional information such as GNSS/GPS location or car parking authorization. As another example, when an Amber alert is published; based on the location of a customer living in the area of the alert a message can be sent via mobile phone to those customers requesting a plate update. If the customer is in the car, the plate will be updated via a BTLE connection. This has the advantage of quickly presenting an Amber alert on the DLP, without requiring an LTE connection from the DLP.

In another embodiment related to parking, a customer can use a mobile phone application to provide parking notices, payments, or authorization. All payments and processing can be handled by the mobile phone, and only the final parking authorization image (e.g. parking sticker) is transferred to the DLP by BTLE, with the majority of power usage occurring on the mobile phone. For those situations when a customer and mobile phone do not retrieve the vehicle (and associated digital license plate) the parking authorization can either be deleted (e.g. short term parking stickers or person specific handicap stickers) or set to remain (e.g. long term vehicle parking stickers) by the DLP, depending upon previously set DLP instructions.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A power system for a digital license plate comprising:
   a digital license plate attached to a vehicle and connected to receive data through a wireless connection, wherein the digital license plate has a SLEEP mode, an ON mode, and an In Motion mode; and wherein
   the digital license plate is configured to receive power from a battery of the vehicle at a voltage;
   a trigger to move from a sleep mode to an ON mode, the trigger being programmed to move from the sleep mode to an ON mode in response to the voltage transitioning from a parked level to an operation level.

2. The power system of claim 1, wherein the parked level is 12.6 volts and the operation level is 13.7 volts.

3. The power system of claim 1, wherein the trigger is further programmed to convert the voltage to a digital value and evaluate whether the digital value indicates transitioning from the parked level to the operation level.

4. A power system for a digital license plate comprising:
   a digital license plate attached to a vehicle and connected to receive data through a wireless connection, wherein the digital license plate has a SLEEP mode, an ON mode, and an In Motion mode; and wherein
   a trigger programmed to move the digital license plate from the SLEEP mode to the In Motion mode in response to a change in vehicle location meeting a threshold condition.

5. The power system of claim 4, wherein the trigger is further programmed to:
   move the digital license plate from the In Motion Mode to the SLEEP mode in response to failing to detect a change in vehicle location meeting the threshold condition for more than a predetermined time.

6. A power system for a digital license plate comprising:
   a digital license plate attached to a vehicle and connected to receive data through a wireless connection, wherein the digital license plate has a SLEEP mode, an ON mode, and an In Motion mode; and wherein
   a trigger programmed to move the digital license plate from the SLEEP mode to the ON mode in response to a detecting a wireless connection to a mobile phone.

* * * * *